United States Patent
Moon et al.

(10) Patent No.: US 11,656,752 B2
(45) Date of Patent: May 23, 2023

(54) ELECTRONIC DEVICE FOR DISPLAYING SLIDER TRACK AND SLIDER AND METHOD OF OPERATING SAME

(71) Applicant: Samsung Electronics Co., Ltd., Suwon-si (KR)

(72) Inventors: Jong Chae Moon, Suwon-si (KR); Jin Ra, Suwon-si (KR); Seo Lynn Park, Suwon-si (KR); Joo Yoon Bae, Suwon-si (KR); Go Eun Lee, Suwon-si (KR); Joo Yeon Cho, Suwon-si (KR); Yong Soung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 214 days.

(21) Appl. No.: 16/220,367

(22) Filed: Dec. 14, 2018

(65) Prior Publication Data

US 2019/0196703 A1   Jun. 27, 2019

(30) Foreign Application Priority Data

Dec. 26, 2017   (KR) .......................... 10-2017-0179396

(51) Int. Cl.
 *G06F 3/04847*  (2022.01)
 *G06F 3/0486*  (2013.01)
 *G06F 3/0488*  (2022.01)

(52) U.S. Cl.
 CPC ........ *G06F 3/04847* (2013.01); *G06F 3/0486* (2013.01); *G06F 3/0488* (2013.01)

(58) Field of Classification Search
 CPC .. G06F 1/1692; G06F 3/04847; G06F 3/0488; G06F 3/16; G06F 3/0486; A63F 2300/6027; G09G 2340/0442
 See application file for complete search history.

(56) References Cited

U.S. PATENT DOCUMENTS

| | | | | |
|---|---|---|---|---|
| 5,339,391 | A | * | 8/1994 | Wroblewski ........ G06F 3/04855 345/607 |
| 6,157,381 | A | * | 12/2000 | Bates ...................... G09G 5/14 715/786 |
| 7,380,216 | B2 | | 5/2008 | Feig et al. |

(Continued)

FOREIGN PATENT DOCUMENTS

| | | |
|---|---|---|
| EP | 1950652 A1 | 7/2008 |
| JP | 2015056353 A | 3/2015 |
| JP | 5806416 B1 | 11/2015 |

OTHER PUBLICATIONS

European Search Report dated May 9, 2019 in connection with European Patent Application No. 18 21 4129, 6 pages.

(Continued)

*Primary Examiner* — John T Repsher, III

(57) ABSTRACT

An electronic device includes: a display; and at least one processor configured to identify one or more boundary values which divide settable values into a plurality of sections, based on context information related to the electronic device, and display a slider that can move within a slider track indicating the settable values through the display, wherein a first interval between settable values within a first section among the plurality of sections is different from a second section between settable values within a second section among the plurality of sections.

12 Claims, 23 Drawing Sheets

(56) References Cited

U.S. PATENT DOCUMENTS

| | | |
|---|---|---|
| 7,676,759 B2 | 3/2010 | Carter |
| 8,737,821 B2 | 5/2014 | Li |
| 8,751,955 B2 | 6/2014 | DeLuca et al. |
| 8,954,889 B2 | 2/2015 | Fujibayashi |
| 8,977,982 B1 * | 3/2015 | Amacker ................. G06F 3/014 715/787 |
| 9,109,945 B1 | 8/2015 | Warnke et al. |
| 9,121,750 B2 | 9/2015 | Rode et al. |
| 9,442,645 B2 | 9/2016 | Lin |
| 2008/0141165 A1 | 6/2008 | Feig et al. |
| 2012/0308204 A1 | 12/2012 | Hwang |
| 2013/0239057 A1 | 9/2013 | Ubillos et al. |
| 2013/0322848 A1 * | 12/2013 | Li .......................... H04N 5/783 386/241 |
| 2014/0188766 A1 * | 7/2014 | Waldman ........... G06Q 30/0255 705/400 |
| 2014/0237419 A1 * | 8/2014 | Ryu .................... G06F 3/04855 715/787 |
| 2014/0282171 A1 | 9/2014 | Glueck et al. |
| 2015/0062641 A1 | 3/2015 | Togawa |
| 2015/0109323 A1 | 4/2015 | Johnson et al. |
| 2015/0331595 A1 | 11/2015 | Ubillos et al. |
| 2016/0063697 A1 * | 3/2016 | Yokota ................. G06T 7/0012 382/131 |
| 2016/0170629 A1 * | 6/2016 | Gabryjelski ........ G06F 3/04842 715/786 |
| 2016/0216873 A1 | 7/2016 | Filippi et al. |
| 2016/0299674 A1 * | 10/2016 | Yamahara ........... G06F 3/04855 |
| 2016/0349976 A1 | 12/2016 | Lauer |
| 2018/0107367 A1 * | 4/2018 | Rinneberg ............ G06F 3/0488 |

OTHER PUBLICATIONS

Examination report dated Sep. 30, 2020 in connection with Indian Application No. 201844047822, 6 pages.
Communication pursuant to Article 94(3) EPC dated Mar. 26, 2021 in connection with European Patent Application No. 18 214 129.1, 6 pages.
Notice of Preliminary Rejection dated Aug. 10, 2022 in connection with Korean Patent Application No. 10-2017-0179396, 15 pages.
Korean Intellectual Property Office, "Notice of Patent Grant," dated Feb. 27, 2023, in connection with Korean Patent Application No. 10-2017-0179396, 5 pages.

* cited by examiner

ELECTRONIC DEVICE FOR DISPLAYING SLIDER TRACK AND SLIDER AND METHOD OF OPERATING SAME

CROSS-REFERENCE TO RELATED APPLICATION(S)

This application is based on and claims priority under 35 U.S.C. § 119 to Korean Patent Application No. 10-2017-0179396, filed on Dec. 26, 2017, in the Korean Intellectual Property Office, the disclosure of which is incorporated by reference herein in its entirety.

BACKGROUND

1. Field

The present disclosure relates to a method and an electronic device for displaying a slider track and a slider through a display of the electronic device.

2. Description of Related Art

The above information is presented as background information only to assist with an understanding of the present disclosure. No determination has been made, and no assertion is made, as to whether any of the above might be applicable as prior art with regard to the present disclosure.

With the development of digital technology, various electronic devices including displays such as smart phones, wearable devices, ovens, air-conditioners, and TVs have been distributed. Various electronic devices may display a user interface for configuring setting values related to functions of various electronic devices or functions of output devices (for example, the above-described devices) connected to various electronic devices through a display. For example, such an electronic device may display a user interface for configuring the temperature of an oven or a user interface for configuring the temperature of an air-conditioner, a brightness of an electronic device, or a volume of a sound output device through a display.

SUMMARY

An electronic device may identify a setting value indicated by a slider on the basis of a location of the slider within a slider track. When the range of settable values indicated by the slider track is wide, a user may have difficulty in minutely controlling the setting value using the slider track and the slider. Further, when the settable values are uniformly located within the slider track, the user may have difficulty in minutely controlling the setting value through the slider track and the slider. Accordingly, a method of adaptively changing the display of the slider track may be required to increase user convenience according to the use of the slider track by the user.

The technical subjects pursued in the present disclosure may not be limited to the above mentioned technical subjects, and other technical subjects which are not mentioned may be clearly understood, through the following descriptions, by those skilled in the art of the present disclosure.

In accordance with an aspect of the present disclosure, an electronic device is provided. The electronic device includes: a display; and at least one processor configured to identify one or more boundary values which divide settable values into a plurality of sections, based on context information related to the electronic device, and display a slider which can move within a slider track indicating the settable values through the display, wherein a first interval between settable values within a first section among the plurality of sections may be different from a second section between settable values within a second section among the plurality of sections.

In accordance with an aspect of the present disclosure, a method of operating an electronic device is provided. The method includes: identifying one or more boundary values which divide settable values into a plurality of sections, based on context information related to the electronic device; and displaying a slider which can move within a slider track indicating the settable values through a display of the electronic device, wherein a first interval between settable values within a first section among the plurality of sections may be different from a second section between settable values within a second section among the plurality of sections.

In accordance with another aspect of the present disclosure, a non-transitory computer-readable storage medium is provided. The non-transitory computer-readable storage medium includes one or more programs for executing operations of: identifying one or more boundary values which divide settable values into a plurality of sections, based on context information related to the electronic device; and displaying a slider that can move within a slider track indicating the settable values through a display of the electronic device, wherein a first interval between settable values within a first section among the plurality of sections may be different from a second section between settable values within a second section among the plurality of sections.

An apparatus and a method according to various embodiments can increase user convenience by changing the display of a slider track, based on context information of the electronic device.

The effects that can be obtained by the present disclosure are not limited to the above-described effects, and other effects that have not been mentioned may be clearly understood by those skilled in the art from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
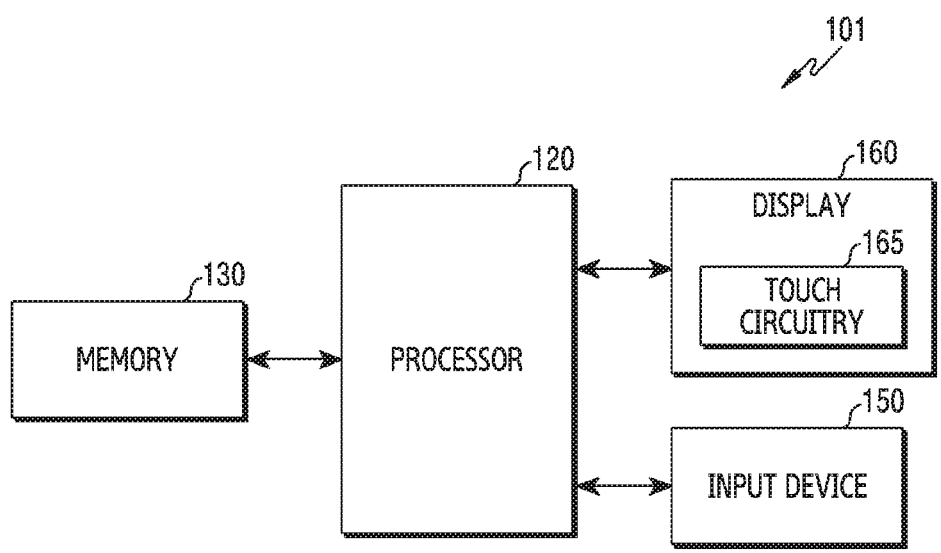
FIG. 1 illustrates an example of a functional configuration of an electronic device according to various embodiments.

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

An electronic device according to various embodiments disclosed herein may be various types of devices. The electronic device may, for example, include at least one of a portable communication device (e.g., smartphone) a computer device, a portable multimedia device, a portable medical device, a camera, a wearable device, and a home appliance. The electronic device according to embodiments of the present disclosure is not limited to the above-described devices.

The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. The terms "A or B", "one or more of A and/or B", "A, B, or C", or "one or more of A, B and/or C" may include all possible combinations of them. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. For example, a module may be an Application-Specific Integrated Circuit (ASIC).

Various embodiments disclosed herein may be implemented by software (e.g., program 140) including an instruction stored in machine-readable storage media (e.g., internal memory 136 or external memory 138). The machine is a device that calls the stored instruction from the storage media and can operate according to the called instruction, and may include an electronic device (e.g., electronic device 101) according to the disclosed embodiments. The instruction, when executed by a processor (e.g., processor 120), may cause the processor to directly execute a function corresponding to the instruction or cause other elements to execute the function under the control of the processor. The instruction may include a code that is generated or executed by a compiler or interpreter. The machine-readable storage media may be provided in the form of non-transitory storage media. Here, the term "non-transitory" only means that the storage media is tangible without including a signal, irrespective of whether data is semi-permanently or transitorily stored in the storage media.

The method according to various embodiments disclosed herein may be included and provided in a computer program product. The computer program product may be traded as a product between a seller and a buyer. The computer program product may be distributed in the form of a machine-readable storage medium (e.g., compact disc read only memory (CD-ROM)), or may be distributed online via an application store (e.g., Play Store™). If distributed online, at least part of the computer program product may be temporarily generated or at least temporarily stored in the machine-readable storage medium, such as memory of the manufacturer's server, a server of the application store, or a relay server.

Each of the elements (e.g., modules or programs) according to various embodiments may include a single entity or multiple entities, and in various embodiments, some sub elements among the above elements may be omitted, or other sub elements may be added. Alternatively or additionally, some elements (e.g., modules or programs) may be integrated into a single element, and the integrated element may still perform the functions performed by each of the corresponding elements in the same or similar manner as before the corresponding elements are integrated. Operations performed by a module, a programming module, or other elements according to various embodiments may be executed sequentially, in parallel, repeatedly, or in a heuristic manner. At least some operations may be executed according to another sequence, may be omitted, or may further include other operations.

FIG. 1 illustrates an example of the functional configuration of an electronic device according to various embodiments.

Referring to FIG. 1, an electronic device 101 may include a processor 120, a memory 130, a display 160, and an input device 150.

The electronic device 101 according to various embodiments may include, for example, at least one of a smart phone, a tablet PC, an electronic book reader, a desktop PC, a laptop PC, a camera, a wearable device, a medical device, a navigation device, an IoT device, a television, a DVD player, an audio device, a refrigerator, an air-conditioner, a cleaner, an oven, a microwave oven, a washing machine, and an air cleaner. The electronic device 101 may include at least one of furniture, a building/structure, a part of a vehicle, and an electronic board.

Alternatively, the electronic device 101 according to various embodiments may be an electronic device (for example, a smart phone) connected to the above-described devices, either wirelessly or through a wire, in order to control the devices. The electronic device 101 according to various embodiments is not limited thereto.

The display 160 is a device for visually providing information to a user of the electronic device 101, and may display a screen. The display 160 may display, for example, various types of content (for example, text, images, videos, icons, and/or symbols). For example, the display 160 may be connected to the processor 120 through a display driver IC (not shown). The display driver IC may receive image information including image data or an image control signal corresponding to a command for controlling the image data from the processor 120 and control the display 160 to display the screen according to the received image information.

The display 160 may include, for example, a Liquid Crystal Display (LCD), a Light-Emitting Diode (LED) display, an Organic Light-Emitting Diode (OLED) display, a Micro Electro Mechanical System (MEMS) display, or an electronic paper display.

According to some embodiments, the display 160 may include a pressure sensor (not shown) for measuring the intensity of pressure applied to a touch circuitry 165 or a touch. The display 160 may receive touch input, gesture input, proximity input, or hovering input by a user's body part through the touch circuitry 165. For example, the touch circuitry 165 may measure a change in a signal (for example, a voltage, an amount of light, resistance, or a magnitude of a charge) for a particular location of the display 160 by controlling a touch sensor to detect touch input or hovering input at the particular location and provide information (for example, a location, an area, pressure, or time) on the detected touch input or hovering input to the processor 120.

According to other embodiments, the display 160 may not include the touch circuitry 165. For example, the electronic device 101 may receive user input through a separate input device 150 (for example, a mouse, a jog wheel, or a remote control) instead of the touch circuitry 165 and display a screen based on the received user input through the display 160.

According to various embodiments, the display 160 may display a user interface for configuring setting values (for example, temperature, brightness, and volume) related to functions of the electronic device 101 or functions of an external device connected to the electronic device 101. The display 160 may display a slider track indicating a range of settable values and a slider which can move within the slider track in the user interface. A location of the slider within the slider track may indicate a current setting value of the electronic device 101 within the range of settable values.

According to various embodiments, the display 160 may display a slider track divided into a plurality of sections within the user interface. For example, the display 160 may display, on the slider track, one or more boundary values which divide the slider track into a plurality of sections. The one or more boundary values may be one or more of settable values within the slider track. The slider track may be divided into a plurality of sections by one or more boundary values included in the slider track.

According to various embodiments, the display 160 may display a slider moving within the slider track on the basis of user input for moving the slider. For example, the display 160 may display a slider moving within the slider track on the basis of user input (for example, a tap or a drag on the slider track) detected through the touch circuitry 165. In another example, the display 160 may display a slider moving within the slider track on the basis of user input received through the input device 150 (for example, a mouse, a jog wheel, or a remote control).

The input device 150 is a device for receiving a command or data to be used by an element of the electronic device 101 (for example, the processor 120) from outside the electronic device 101 (for example, the user). For example, the input device 150 may include a mouse, a jog wheel, or a remote control.

According to various embodiments, the input device 150 may be used to receive user input for configuring setting values (for example, temperature, brightness, and volume) related to functions of the electronic device 101. The input device 150 may be used to receive user input for moving a slider within a slider track displayed through the display 160. According to some embodiments, when the remote control is used as the input device 150, the electronic device 101 may communicate with the remote control through wireless communication. When the remote control is used as the input device 150, the electronic device 101 and the input device 150 may further include a communication module (not shown).

The processor 120 may control the overall operation of the electronic device 101. The processor 120 may control at least one other element (for example, a hardware or software element) of the electronic device 101 connected to the processor 120 and perform various data processing and calculations by driving software (for example, a program). The processor 120 may load a command or data received from another element (for example, the display 160, the input device 150, or the memory 130) in volatile memory, process the loaded command or data, and store the resultant data in nonvolatile memory. According to an embodiment, the processor 120 may include a main processor (for example, a central processing unit or an application processor) and an auxiliary processor (for example, a graphic processing unit, an image signal processor, a sensor hub processor, or a communication processor) operating independently from the main processor and additionally or alternatively using lower power than the main processor or specified for a predetermined function. The auxiliary processor may operate separately from the main processor or may be embedded into the main processor.

According to various embodiments, the processor 120 may control the display 160 to display a user interface for configuring setting values of the electronic device 101. The processor 120 may control the display 160 to display a slider track indicating a range of settable values and a slider which can move within the slider track in the user interface.

According to various embodiments, the processor 120 may determine one or more boundary values that divide the slider track into a plurality of sections. For example, the processor 120 may determine one or more boundary values on the basis of context information related to setting values of the electronic device 101. The processor 120 may control the display 160 to display the one or more determined boundary values on the slider track. For example, the processor 120 may transmit data indicating the one or more determined boundary values to the display driver IC. The display driver IC may control the display 160 to display one or more boundary values or display motion (or animation) of the one or more boundary values on the basis of the received data.

According to various embodiments, the processor 120 may receive user input for moving the slider within the slider track. For example, the processor 120 may receive user input (for example, a tap or a drag on the slider track) through the touch circuitry 165. In another example, the processor 120 may receive user input through the input device 150 (for example, a mouse, a jog wheel, or a remote control). For example, the processor 120 may receive user input for moving the slider to a particular position within the slider track or moving the slider in a particular direction. The processor 120 may determine a location of the slider corresponding to the received user input and control the display 160 to display the slider at the determined location.

According to various embodiments, the processor 120 may determine a setting value corresponding to the received user input among the settable values within the slider track. The processor 120 may control functions of the electronic device 101 related to the setting value or control functions of an external device connected to the electronic device 101 on the basis of the determined setting value.

According to some embodiments, the processor 120 may control an output device of the electronic device 101 (for example, a thermal output device, a cooling device, a heating device, a sound output device, or the display 160) related to the setting value on the basis of the determined setting value. For example, when the electronic device 101 is an oven, the processor 120 may control the thermal output device included in the electronic device 101 according to a temperature corresponding to the setting value. In another example, the processor 120 may control the display 160 to output the screen with brightness corresponding to the setting value.

According to other embodiments, the processor 120 may control the output device (for example, the thermal output device, the cooling device, the heating device, or the sound output device) connected to the electronic device 101 wirelessly or through a wire on the basis of the determined setting value. For example, the electronic device 101 may control a sound output device (for example, a speaker) wirelessly connected to the electronic device 101 to output a sound with a volume corresponding to the setting value.

The memory 130 may store various pieces of data used by at least one element of the electronic device 101 (for example, the processor 120, the input device 150, the display 160, or the touch circuitry 165). For example, the memory 130 may store software (for example, a program) and input data or output data on a command related to the software. The memory 130 may execute instructions stored in the memory 130 on the basis of signaling with the processor 120. The memory 130 may store data and/or commands received from different elements (for example, the processor 120, the input device 150, the display 160, and the touch circuitry 165) or generated by the different elements. The memory 130 may be a set of one or more memories. The memory 130 may include volatile memory or nonvolatile memory.

According to various embodiments, the memory 130 may store information on various values related to the slider track and the slider. For example, the memory 130 may store information on a maximum value and a minimum value of the settable values in the slider track. The memory 130 may store information on an interval of the settable values. The memory 130 may store information on a location of the slider in the slider track or a setting value corresponding to the location of the slider.

According to various embodiments, the memory 130 may store information on one or more boundary values which divide the slider track into a plurality of sections. The memory 130 may store information on one or more determined boundary values on the basis of context information related to the setting value of the electronic device 101. The memory 130 may store information on one or more boundary values changed or updated on the basis of context information. The memory 130 may temporarily store information on one or more boundary values.

According to various embodiments, the memory 130 may store information on an interval between settable values for each of a plurality of sections. For example, the slider track may be divided into a plurality of sections including a first section and a second section. The memory 130 may store information on a first interval between settable values in the first section and information on a second interval between settable values in the second section. The first interval and the second interval may be changed or updated on the basis of context information or the location of the slider.

The electronic device (for example, the electronic device 101) according to various embodiments may include the display (for example, the display 160) and at least one processor (for example, the processor 120) configured to identify one or more boundary values which divide settable values into a plurality of sections on the basis of context information related to the electronic device and display a slider which can move within a slider track indicating the settable values through the display. The first interval between the settable values within the first section among the plurality of intervals may be different from the second interval between the settable values within the second section among the plurality of intervals.

Figure 2:
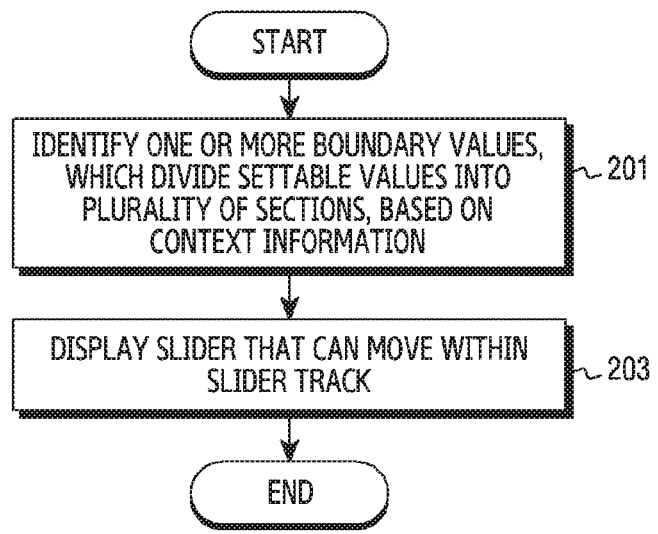
FIG. 2 illustrates an example of an operation of the electronic device according to various embodiments.

FIG. 2 illustrates an example of the operation of the electronic device 101 according to various embodiments.

Figure 3:
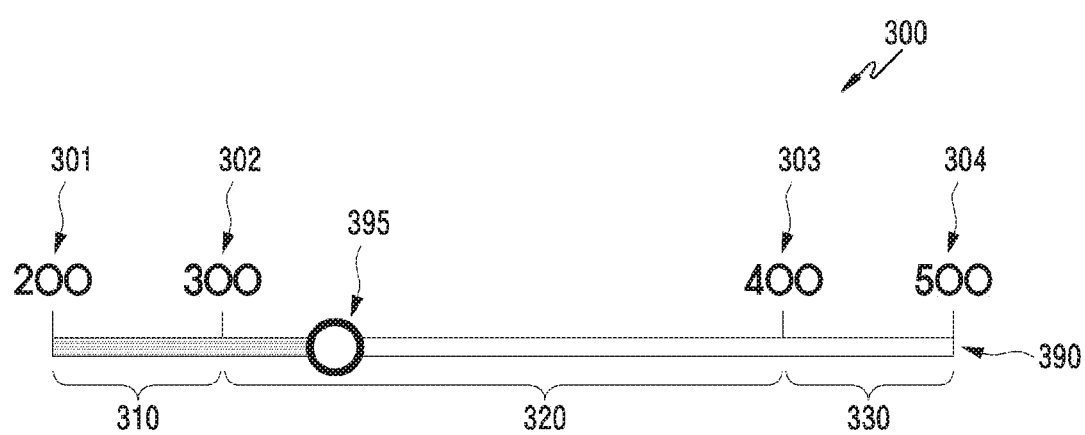
FIG. 3 illustrates an example of a user interface for configuring a setting value according to various embodiments.
Figure 4:
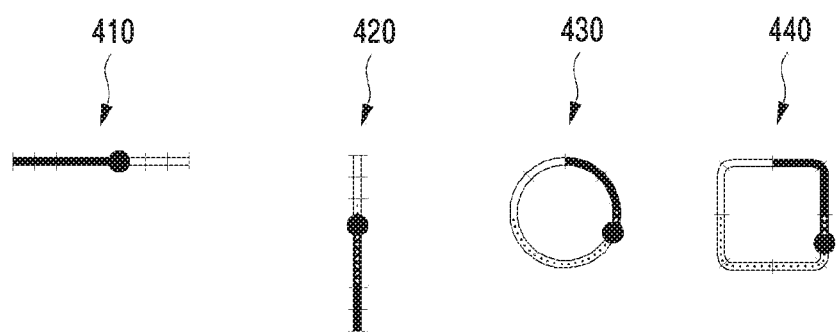
FIG. 4 illustrates an example of a shape of a slider track according to various embodiments.

FIG. 3 illustrates an example of a user interface for configuring a setting value according to various embodiments. FIG. 2 may be described in connection with a user interface 300 of FIG. 3. FIG. 4 illustrates an example of the shape of a slider track according to various embodiments.

Referring to FIG. 2, the processor 120 may identify one or more boundary values which divide settable values into a plurality of sections on the basis of context information in operation 201.

For example, referring to FIG. 3, the processor 120 may display the user interface 300 for configuring a setting value through the display 160. The user interface 300 may include a slider track 390 indicating settable values and a slider 395 which can move within the slider track. The slider track 390 may indicate settable values from a minimum value 301 to a maximum value 304. The slider 395 may indicate a current setting value of the electronic device among the settable values.

The settable values may be values from the minimum value 301 to the maximum value 304. The settable vales may be divided into a plurality of sections 310, 320, and 330 by one or more boundary values 302 and 303. The one or more boundary values 302 and 303 may be determined to be values larger than the minimum value 301 and smaller than the maximum value 304. For example, the settable values may be divided into a first section 310, a second section 320, and a third section 330 by a first boundary value 301 and a second boundary value 303. For example, the first section 310 may be a section from the minimum value 301 to the first boundary value 302, the second section 320 may be a section from the first boundary value 302 to the second boundary value 303, and the third section 330 may be a section from the second boundary value 303 to the maximum value 304.

However, the present disclosure is not limited thereto. For example, one or more boundary values, the number of the one or more boundary values, a plurality of sections, and the number of the plurality of sections are not limited thereto, and may be adaptively changed according to circumstances.

The processor 120 may store one or more pieces of information on the minimum value 301, information on the maximum value 304, or information on one or more boundary values 302 and 303 in the memory 130 in order to display the user interface 300. For example, the processor 120 may store information on one or more boundary values according to context information in the memory 130.

In operation 201, the processor 120 may identify context information related to the electronic device 101 or the user interface 300 and identify one or more boundary values 302 and 303 on the basis of the identified context information. The context information may include a current time, a type of an output device (for example, a headset or a speaker) related to the user interface 300, or usage records of setting values. A detailed description of the operation for identifying the one or more boundary values on the basis of context information will be made below with reference to FIGS. 5 to 8.

In operation 203, the processor 120 may display a slider which can move within a slider track indicating settable values through the display 160. The processor 120 may display a slider track on which one or more boundary values are displayed and a slider which can move within the slider track through identification of one or more boundary values on the basis of context information in operation 201.

For example, referring to FIG. 3, the processor 120 may display a slider track 390 divided into a plurality of sections 310, 320, and 330 on the basis of one or more boundary values 302 and 303. The processor 120 may display a slider 395 located in one section (for example, the second section 320) among a plurality of sections 310, 320, and 330.

According to various embodiments, intervals between settable values within each of the plurality of sections 310, 320, and 330 may be different from each other. For example, a first interval between settable values within the first section 310, a second interval between settable values within the second section 320, and a third interval between settable values within the third section 330 may be different from each other.

According to some embodiments, the interval for each of the plurality of sections 310, 320, and 330 may be determined on the basis of a location of the slider 395. For example, the interval between settable values within the section in which the slider 395 is located (for example, the second section 320) may be smaller than the interval between settable values within the remaining sections (for example, the first section 310 and the third section 330).

According to other embodiments, the interval for each of the plurality of sections 310, 320, and 330 may be determined on the basis of usage records of the settable values used within each of the plurality of sections. For example, when the number of settable values used in the first section is larger than the number of settable values used in the second section, the first interval for the first section may be smaller than the second interval for the second section. However, the present disclosure is not limited thereto.

Referring to FIG. 4, the processor 120 may display a slider which can move within a slider track in various shapes. For example, the shapes of the slider track may include a horizontal shape 410, a vertical shape 420, a round shape 430, and a rectangular shape 440, without being limited thereto.

Figure 5:
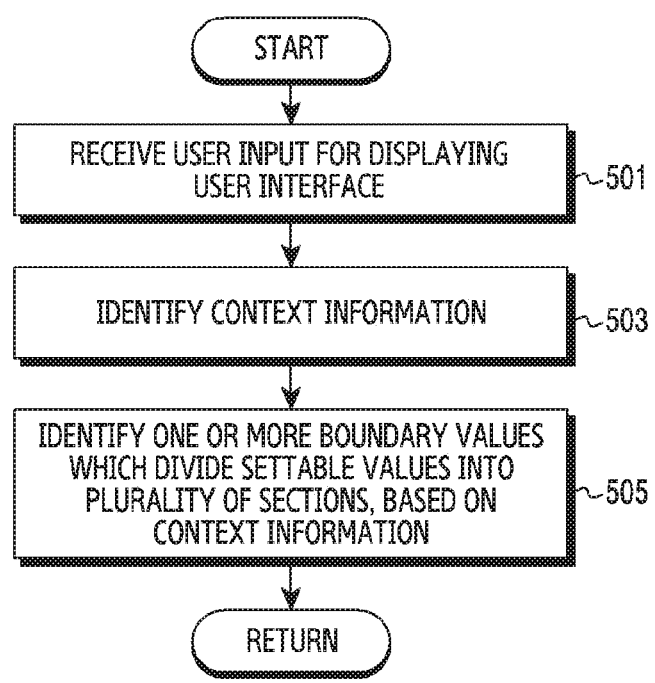
FIG. 5 illustrates an example of the operation in which the electronic device identifies one or more boundary values on the basis of context information according to various embodiments.

FIG. 5 illustrates an example of the operation in which the electronic device identifies one or more boundary values on the basis of context information according to various embodiments. Operations of FIG. 5 may be performed for operation 201 of FIG. 2.

Figure 6:
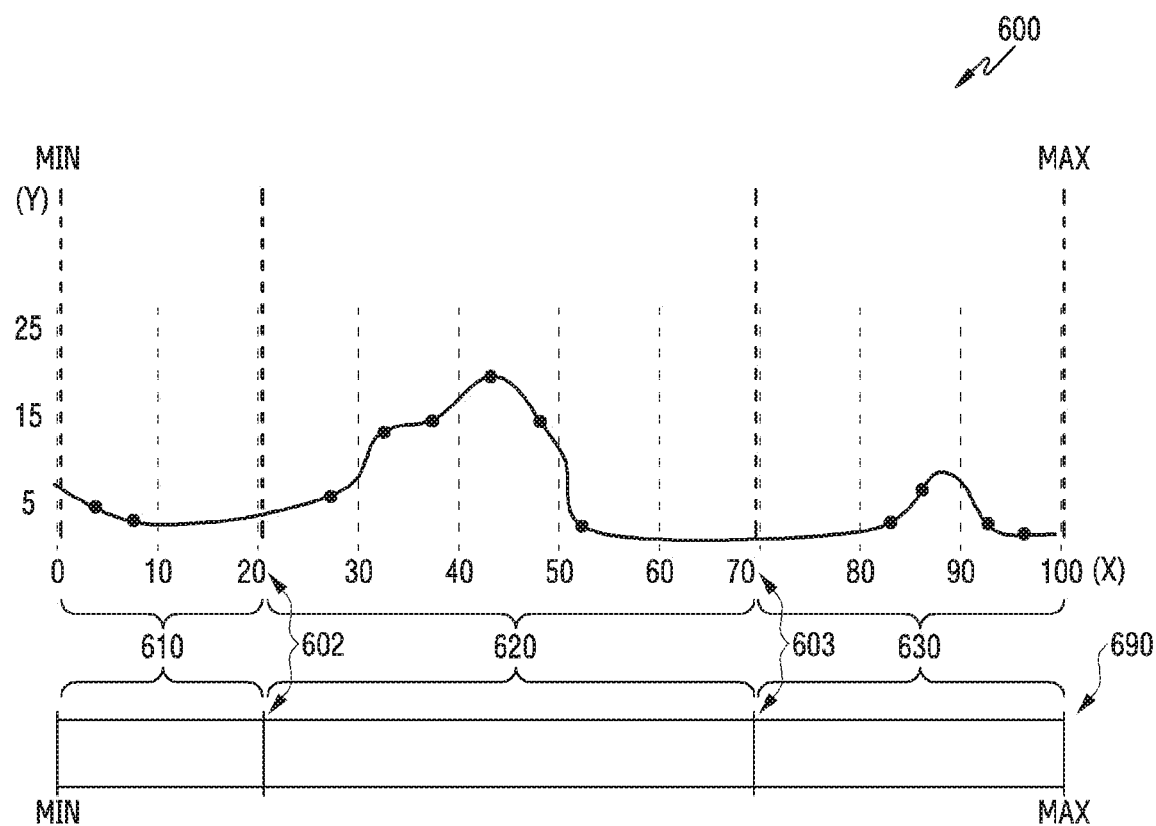
FIG. 6 illustrates a method by which the electronic device identifies one or more boundary values on the basis of a use history of settable values, which is context information, according to various embodiments.
Figure 7:
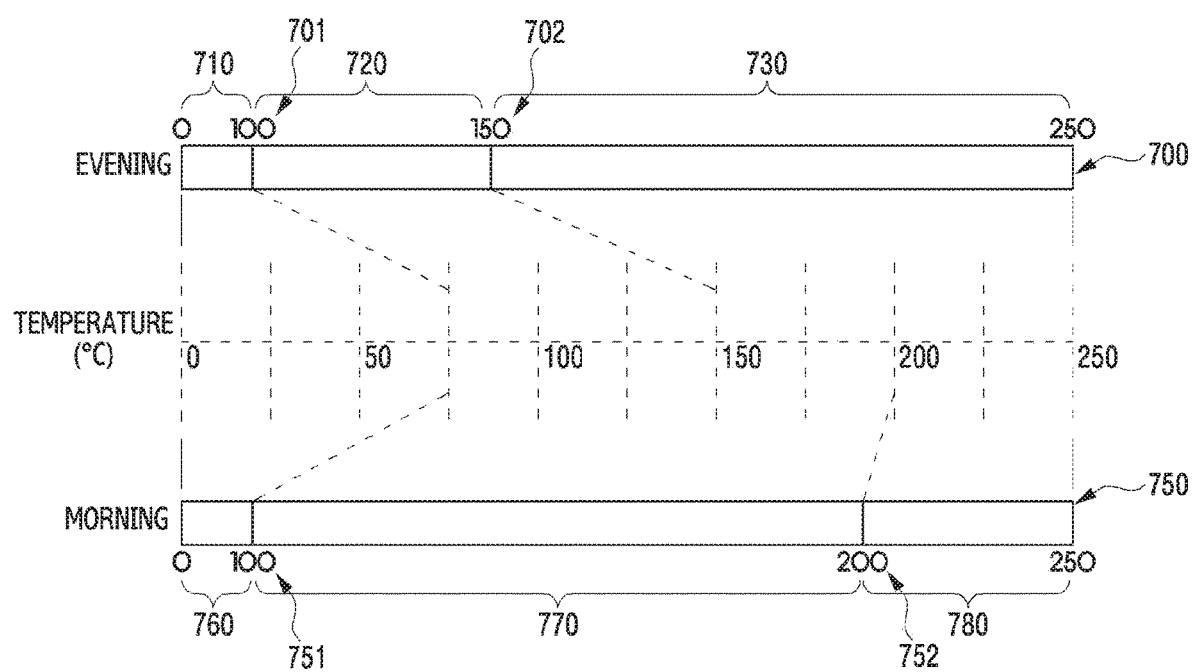
FIG. 7 illustrates an example of a slider track displayed on the basis of a current time, which is context information, in the electronic device according to various embodiments.
Figure 8:
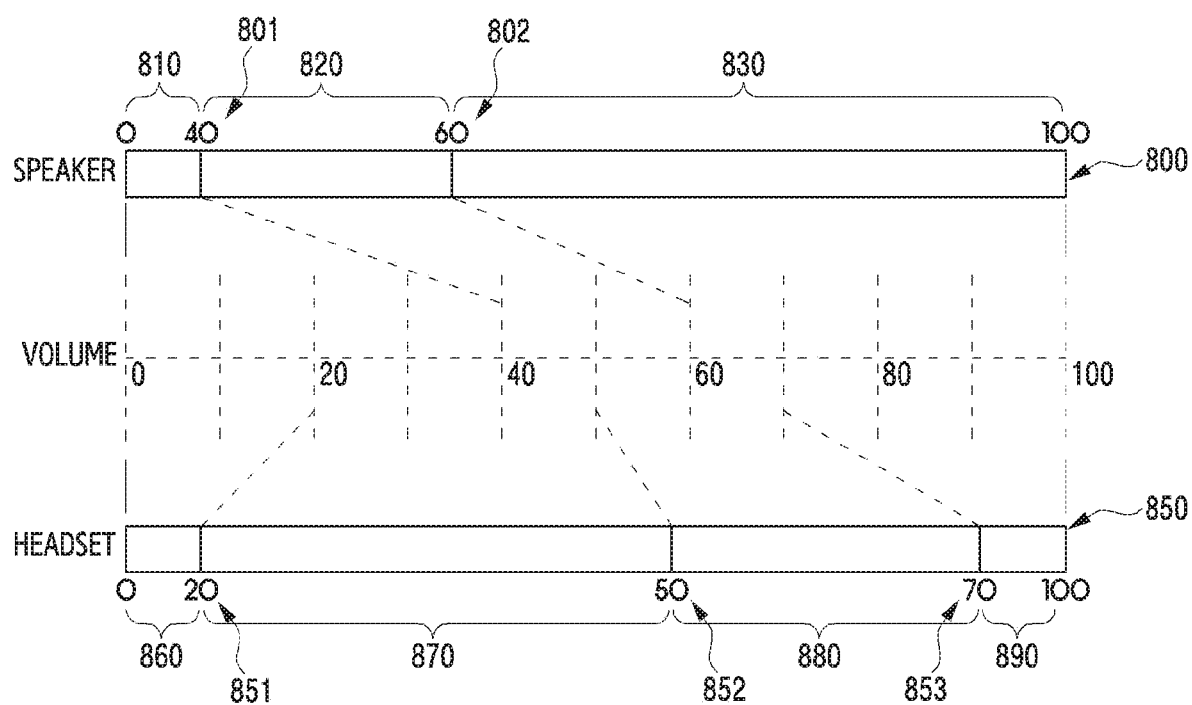
FIG. 8 illustrates an example of a slider track displayed on the basis of a type of an output device, which is context information, in the electronic device according to various embodiments.

FIG. 6 illustrates a method by which the electronic device identifies one or more boundary values on the basis of a usage history of settable values as context information according to various embodiments. FIG. 7 illustrates an example of a slider track displayed in the electronic device on the basis of a current time as context information according to various embodiments. FIG. 8 illustrates an example of a slider track displayed on the basis of a type of an output device as context information in the electronic device according to various embodiments.

Referring to FIG. 5, in operation 501, the processor 120 may receive user input for displaying a user interface for configuring setting values. The user input may be user input for entering the user interface. The user input may be user input for initiating display of the user interface.

In operation 503, the processor 120 may identify context information related to the electronic device 101 or the user interface in response to reception of the user input for displaying the user interface.

According to some embodiments, the processor 120 may identify a usage history of the setting values as context information. According to other embodiments, the processor 120 may identify a current time as context information. According to other embodiments, the processor 120 may identify a type of an output device related to the user interface as context information. For example, the processor 120 may identify whether a sound output device is a speaker or a headset (or earphones) through display of the user interface for configuring a volume of the sound output device In operation 505, the processor 120 may identify one or more boundary values on the basis of the identified context information. Operation 505 may correspond to operation 201 of FIG. 2.

According to some embodiments, referring to FIG. 6, the processor 120 may identify one or more boundary values on the basis of usage records of the setting values as context information. For example, the processor 120 may store the used setting values among the settable values as the usage records (or usage history) in the memory 130.

A graph 600 may indicate usage records (or usage history) of the setting values stored in the memory 130. The horizontal axis X of the graph 600 may indicate settable values (or percentages of the settable values) using the slider track. The vertical axis Y of the graph 600 may indicate the number of uses or the use rate of the settable values. For example, peaks of the graph 600 may indicate setting values frequently used by the electronic device 101, among the settable values.

The processor 120 may acquire (determine or calculate) one or more boundary values 602 and 603 on the basis of the usage records (or usage history) of the setting values stored in the memory 130. According to an embodiment, the processor 120 may acquire one or more boundary values 602 and 603 to group the frequently used setting values into a single section (for example, a section 610, 620, or 630). The processor 120 may acquire one or more boundary values 602 and 603 such that each of a plurality of sections 610, 620, and 630 includes the peak of the graph 600. For example, the processor 120 may acquire values corresponding to a minimum point of the graph 600 as the one or more boundary values 602 and 603. The processor 120 may acquire values corresponding to a point at which a slope of the graph 600 is changed from a negative value to a positive value as the one or more boundary values 602 and 603. The processor 120 may store information on the one or more acquired boundary values 602 and 603 in the memory 130.

When the electronic device 101 has usage records such as the graph 600, the processor 120 may display a slider track 690 within a user interface for configuring setting values. For example, the processor 120 may identify the one or more pre-stored boundary values 602 and 603 on the basis of the usage records of the setting values in response to reception of user input for displaying the user input for configuring setting values. In another example, the processor 120 may acquire (determine or calculate) the one or more boundary values 602 and 603 on the basis of the usage records of the setting values in response to reception of user input for displaying the user interface. The processor 120 may identify the one or more acquired boundary values 602 and 603.

The processor 120 may display the slider 690 within the user interface through the identification of the one or more boundary values 602 and 603. The processor 120 may display the slider 690 divided into a plurality of sections 610, 620, and 630 by the one or more identified boundary values 602 and 603.

Although not illustrated, the size of each of the plurality of sections 610, 620, and 630 may be changed. The size of each of the plurality of sections may indicate the size, length, or ratio at which each of the plurality of sections is displayed within the slider track through the display 160. For example, the ratio {size of first section 610:size of second section 620:size of third section 630} may be different from {20: 50:30}, which is an absolute numerical ratio. According to an embodiment, the processor 120 may determine the size of each of the plurality of sections on the basis of the usage records of the setting values. For example, the processor 120 may further enlarge the size of the second section 620, which is most frequently used, compared to the first section 610 and the third section 630.

Although not illustrated, a first interval between settable values within the first section 610, a second interval between settable values within the second section 620, and a third interval between settable vales within the third section 630 may be different from each other. According to an embodiment, the processor 120 may determine the first interval, the second interval, and the third interval on the basis of the usage records of the setting values. For example, the processor 120 may determine that the second interval for the second section 620, which is most frequently used, is narrower than the first interval and the third interval.

The used setting values may be accumulated according to the use of the electronic device 101, and the usage records (or usage history) of the setting values may be changed (or updated) according to the accumulation of the used setting values. According to the change in the usage records of the setting values, the one or more boundary values 602 and 603 may be changed. For example, according to the change in the usage records of the setting values, the processor 120 may re-acquire (or re-calculate) the one or more changed boundary values. The processor 120 may store the one or more changed boundary values in the memory 130. On the basis of the change in the usage records of the setting values, the processor 120 may change the size of each of the plurality of sections 610, 620, and 630 or an interval for each of the plurality of sections 610, 620, and 630.

According to an embodiment, on the basis of the change in the usage records of the setting values, the processor 120 may add a new boundary value to the one or more boundary values 602 and 603 or delete at least one of the one or more boundary values 602 and 603. The electronic device 101 may provide an optimized slider track to the user according to the use pattern of the user of the electronic device 101 by adaptively changing the one or more boundary values, the size of each of the plurality of sections, or the interval for each of the plurality of sections.

According to other embodiments, referring to FIG. 7, the processor 120 may identify one or more boundary values on the basis of the current time as context information. For example, the processor 120 may display one of a slider track 700 and a slider track 750 within the user interface according to the current time in response to reception of user input for displaying the user interface for configuring setting values.

The processor 120 may store information on one or more boundary values 701 and 702 for a first time section (for example, evening) and information on one or more boundary values 751 and 752 for a second time section (for example, morning) in the memory 130. The processor 120 may store the one or more boundary values 701 and 702 for the first time section (for example, the evening) and the one or more boundary values 751 and 752 for the second time section (for example, the morning) depending on the purpose of the user interface for configuring setting values.

For example, referring to FIG. 7, the slider track 700 or the slider track 750 may be displayed within a user interface for configuring a temperature for cooking foods in an oven. In the user interface, a temperature between 150° C. and 250° C. may be frequently used to cook steak in the first time section (for example, the evening). In the user interface, a temperature between 100° C. and 200° C. may be frequently used to bake bread in the second time section (for example, the morning). In the user interface, a temperature between 0° C. and 100° C. may be seldom used.

According to the purpose of the user interface according to the time as described above, the processor 120 may store information on one or more boundary values which divide settable values (for example, 0° C. to 250° C.) into a plurality of sections in the memory 130. For example, in the first time section (for example, the evening), the processor 120 may store 100° C. as a first boundary value 701 and 150° C. as a second boundary value 702. In the second time interval (for example, the morning), the processor 120 may store 100° C. as a first boundary value 751 and 200° C. as a second boundary value 752.

In response to reception of the user input for displaying the user interface for configuring setting values, the processor 120 may identify the current time as context information and identify one or more boundary values stored in the memory 130 on the basis of the current time. When the current time is included in the first time section, the processor 120 may display the slider track 700 on which the first boundary value 701 and the second boundary value 702 are displayed. When the current time is included in the second time section, the processor 120 may display the slider track 750 on which the first boundary value 751 and the second boundary value 752 are displayed.

In connection with the first time section, the memory 130 may store information on the size of a first section 710, the size of a second section 720, and the size of a third section 730. In connection with the first time section, the memory 130 may store information on the size of a first section 760, the size of a second section 770, and the size of a third section 780. For example, with respect to the first time interval, the ratio {size of first section 710:size of second section 720:size of third section 730} may be different from {100:50:100} which is an absolute numerical ratio.

For example, on the basis of the purpose of the user interface for configuring temperature for cooking foods in an oven according to the time, the processor 120 may store information on the size of the first section 710, the size of the second section 720, and the size of the third section 730 in the memory 130. In the user interface, since the temperature of the third section 730 may be frequently used to cook steak in the first time interval (for example, the evening), the processor 120 may store the size of third section 730 larger than the sizes of the remaining sections 710 and 720. In the user interface, since the temperature of the second section 770 may be frequently used to bake bread in the second time interval (for example, the morning), the processor 120 may store the size of the second section 770 larger than the sizes of the remaining sections 760 and 780. In the user interface, since the temperature of the first section may be seldom used, the processor 120 may store the size of the first section 710 to be smaller than the sizes of the remaining sections 720, 730, 770, and 780.

The memory 130 may store information on an interval between settable values within the plurality of sections (for example, the sections 710, 720, 730, 760, 770, and 780). For example, in the first time section, the third section 730 may be more frequently used than the first section 710, and thus the processor 120 may store an interval for the third section 730 narrower than an interval for the first section 710 in the memory 130.

According to an embodiment, the processor 120 may determine a characteristic value (for example, a boundary value, the size of a section, and an interval) of the slider track on the basis of all of the current time and the usage records of setting values as context information. For example, the processor 120 may determine one or more boundary values (for example, the boundary values 701, 702, 751, and 752) on the basis of all of the current time and the usage records of setting values as context information. The processor 120 may change one or more boundary values (for example, the boundary values 701, 702, 751, and 752) stored in the memory 130 according to accumulation of the used setting values. For example, according to the accumulation of the setting values used in the first time section, the first boundary value 701 for the first time section and the second boundary value 702 for the first time interval may be changed. The operation for changing the one or more boundary values may be performed as illustrated in FIG. 6.

The processor 120 may determine the size of each of the plurality of sections (for example, sections 710, 720, 730, 760, 770, and 780) on the basis of all of the current time and the usage records of setting values as context information. The processor 120 may change the size of each of the plurality of sections (for example, sections 710, 720, 730, 760, 770, and 780) stored in the memory 130 according to accumulation of the used setting values. For example, as the setting values used in the second section 720 are accumulated in the first time section, the processor 120 may further enlarge the size of the second section 720.

The processor 120 may determine the interval for each of the plurality of sections (for example, sections 710, 720, 730, 760, 770, and 780) on the basis of all of the current time and the usage records of setting values as context information. The processor 120 may change the interval for each of the plurality of sections (for example, sections 710, 720, 730, 760, 770, and 780) stored in the memory 130 according to accumulation of the used setting values. For example, as the setting values used in the second section 720 are accumulated in the first time section, the processor 120 may further narrow the interval for the second section 720.

The electronic device 101 may provide an optimized slider track to the user according to a use pattern of the user of the electronic device 101 by adaptively changing characteristic values (for example, a boundary value, the size of a section, and an interval) of the slider track according to at least one piece of context information described above.

According to some embodiments, referring to FIG. 8, the processor 120 may identify one or more boundary values on the basis of a type of an output device (for example, a speaker or a headset) controlled by a slider track as context information. For example, the processor 120 may identify whether a sound output device connected to the electronic device 101 is a speaker or a headset (or earphones) in response to reception of user input for displaying a slider track for configuring a volume. The processor 120 may identify one or more boundary values 801 and 802 stored in the memory 130 and display a slider track 800 on the basis of identification that the sound output device connected to the electronic device 101 is a speaker. The processor 120 may identify one or more boundary values 851 and 852 stored in the memory 130 and display a slider track 850 on the basis of identification that the sound output device connected to the electronic device 101 is a headset.

The memory 130 may store information on the size of each of the plurality of sections 810, 820, 830, 860, 870, 880, and 890 or information on an interval for each of the plurality of sections 810, 820, 830, 860, 870, 880, and 890 as well as the one or more boundary values.

For example, when the electronic device 101 outputs a sound through a speaker, a volume between 60 and 100, corresponding to a high volume, may be frequently used, and a volume between 0 and 40, corresponding to a low volume may be seldom used. Accordingly, when the sound output device is a speaker, the memory 130 may store volume 40 as the first boundary value 801 and volume 60 as the second boundary value 802, store the size of the first section 810 to be small and the size of the third section 830 to be large, and store the interval between settable values within the first section 810 to be wide and the interval between settable vales within the third section 830 to be narrow. When the electronic device 101 outputs a sound through a headset, a volume between 20 and 50 and a volume between 50 and 70, corresponding to an intermediate volume, may be frequently used. Accordingly, when the sound output device is the headset, the memory 130 may store volume 20 as the first boundary value 851, volume 50 as the second boundary value 852, and volume 70 as the third boundary value 853.

The characteristic values (for example, the boundary value, the size of sections, and the interval) of the slider track described above may be predetermined or changed according to accumulation of the used setting values. For example, the processor 120 may determine characteristic values (for example, a boundary value, the size of sections, and an interval) of the slider track on the basis of all of the type of an output device controlled by the slider track and usage records of setting values as context information. The operation for changing the characteristic values of the slider track may be performed as described with reference to FIGS. 6 and 7.

According to various embodiments, the context information is not limited to the above-described example, and may be generated by combining one or more of a plurality of pieces of context information. The electronic device 101 may provide an optimized slider track to the user according to the use pattern of the user of the electronic device 101 by adaptively changing the characteristic values of the slider track on the basis of one or more pieces of context information.

In operation 505, after identifying one or more boundary values on the basis of context information, the processor 120 may return to operation 203 of FIG. 2 and display the slider track and the slider on the basis of the one or more identified boundary values. The processor 120 may identify not only one or more boundary values but also the size of each of the plurality of sections and the interval for each of the plurality of sections as the characteristic values of the slider track in operation 505, and return to operation 203 and display the slider track and the slider on the basis of the identified characteristic values.

Figure 9:
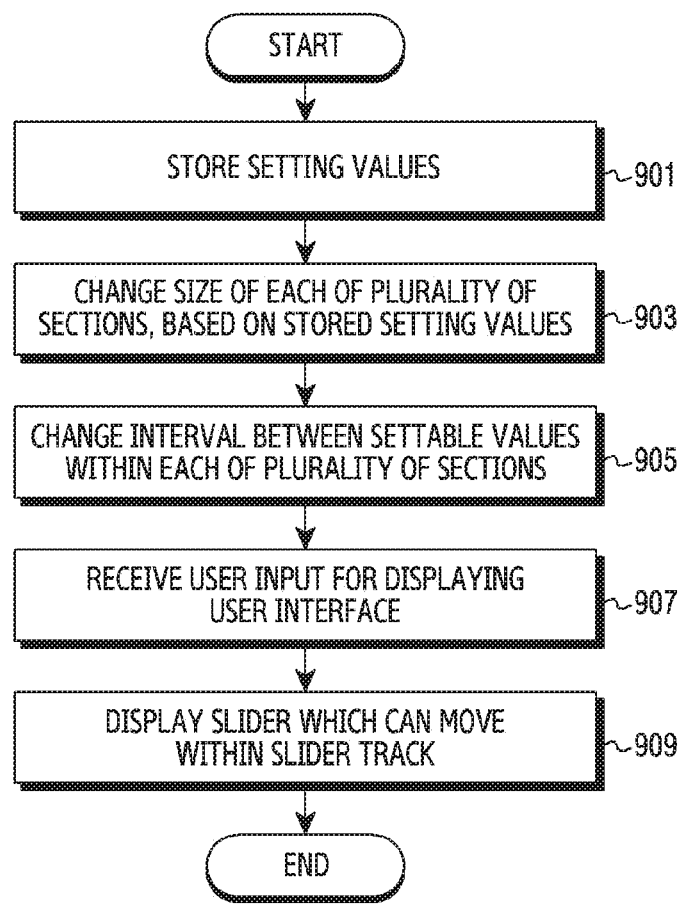
FIG. 9 illustrates an example of an operation in which the electronic device displays a changed slider track on the basis of the use of the slider track according to various embodiments.
Figure 10:
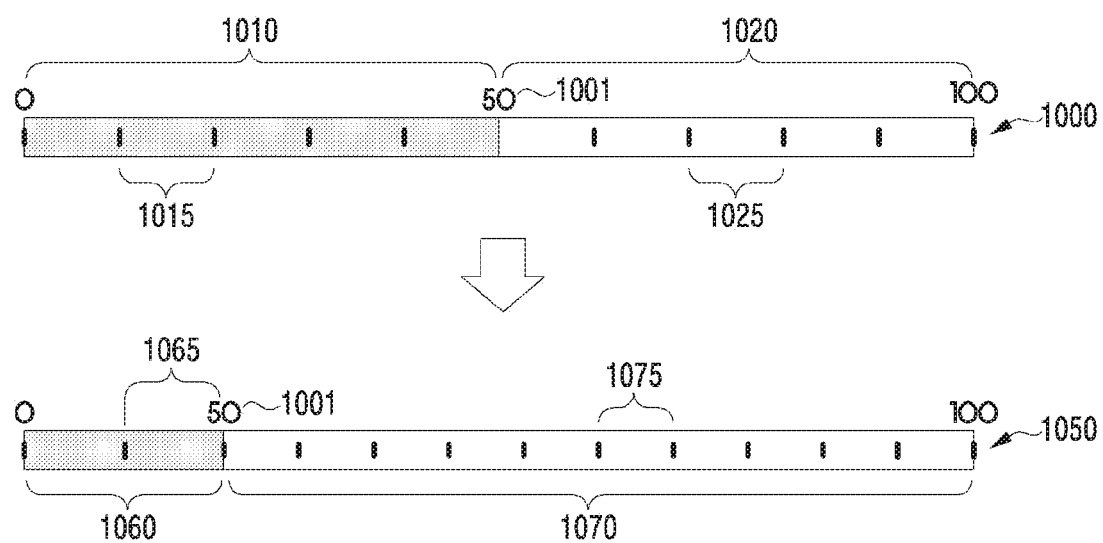
FIG. 10 illustrates an example of a changed slider track on the basis of the use of the slider track in the electronic device according to various embodiments.

FIG. 9 illustrates an example of an operation in which the electronic device displays a changed slider track on the basis of the use of the slider track according to various embodiments. FIG. 10 illustrates an example of a changed slider track on the basis of the use of the slider track in the electronic device according to various embodiments.

Referring to FIG. 9, in operation 901, the processor 120 may store setting values used on the slider track. For example, the processor 120 may store information on setting values in the memory 130 on the basis of no change in setting values for a predetermined time.

In operation 903, the processor 120 may change the size of each of the plurality of sections on the basis of the stored setting values. The size of each of the plurality of sections may indicate the size, length, or ratio at which each of the plurality of sections is displayed within the slider track through the display 160. For example, the processor 120 may enlarge the size of the first section compared to the size of the second section on the basis of storage of setting values used in the first section, among the plurality of sections. For example, when the difference between the number of setting values used in the first section and the number of setting values used in the second section is larger than or equal to a predetermined value, the processor 120 may enlarge the size of the first section compared to the size of the second section. For example, the processor 120 may acquire the size of the first section and the size of the second section according to an equation or a table using the setting values used in the first section and the setting values used in the second section.

For example, referring to FIG. 10, in the beginning, the processor 120 may display a slider track 1000. For the initial slider track 1000, the processor 120 may store the size of the first section 1010 and the size of the second section 1020 in equal proportions. For example, when a first section 1010 corresponds to a range from 0 to 50 and a second section 1020 corresponds to a range from 50 to 100, the ratio {size of first section 1010:size of second section 1020} may correspond to {1:1} in the beginning. The processor 120 may store setting values in the memory 130 as the user of the electronic device 101 uses the slider track 1000. The processor 120 may change the size of each of the plurality of sections on the basis of the stored setting values. For example, the processor 120 may determine the size of a second section 1070, which is enlarged from the size of the second section 1020, on the basis of identification that the number of setting values used in the second section 1020 is large. The processor 120 may determine the size of a first section 1060, which is reduced from the size of the first section 1010, on the basis of identification that the number of setting values used in the first section 1010 is small.

In operation 905, the processor 120 may change an interval between settable values within each of the plurality of sections. The processor 120 may change a first interval between settable values within the first section and a second interval between settable values within the second section. For example, the processor 120 may change the first interval and the second interval on the basis of the setting values that are used. The processor 120 may narrow the second interval compared to the first interval on the basis of a determination that the number of setting values used in the second section is larger than the number of setting values used in the first section. In another example, the processor 120 may change the first interval and/or the second interval on the basis of the size of each of the plurality of sections. The processor 120 may make the second interval narrower than the first interval on the basis of a determination that the size of the second section is larger than the size of the first section.

For example, referring to FIG. 10, the processor 120 may change the interval for each of the plurality of sections on the basis of the stored setting values. The processor 120 may change a first interval 1015 into a first interval 1065 and a second interval 1025 into a second interval 1075 as the used setting values are accumulated. For example, the processor 120 may acquire (or store) the second interval 1075, which has become narrower than the second interval 1025, and/or the first interval 1065, which has become wider than the first interval 1015, on the basis of identification that the number of setting values used in the second section 1020 is larger than the number of setting values used in the first section 1010. In another example, the processor 120 may change the first interval and/or the second interval on the basis of the size of each of the plurality of sections. The processor 120 may narrow the second interval 1075 compared to the first interval 1065 on the basis of identification that the size of the second section 1070 is larger than the size of the first section 1060 on the slider track 1050.

For example, in the initial slider track 1000, the first interval 1015 and the second interval 1025 may correspond to 10. Accordingly, values settable through the slider 1000 in its initial state may correspond to 0, 10, 20, 30, 40, 50, 60, 70, 80, 90, and 100. The processor 120 may acquire (or identify) the second interval 1075, which has become narrower than the second interval 1025, and/or the first interval 1065, which has become wider than the first interval 1015, on the basis of identification that a larger number of values is used within the second section 1020 than within the first section 1010. For example, the first interval 1065 may correspond to 25 and the second interval 1075 may correspond to 5. Accordingly, values settable through the slider 1050, changed according to use by the user, may correspond to 0, 25, 50, 55, 60, 65, 70, 75, 80, 85, 90, 95, and 100.

The values described above are only examples for description, and are not limited thereto. Further, the processor 120 may maintain the first interval and narrow only the second interval on the basis of identification that the number of values used within the second section is larger.

Operation 903 and operation 905 may be changed in order, or may be performed simultaneously or in parallel. According to an embodiment, only one of operation 903 and operation 905 may be performed. Further, although the boundary value 1001 is fixed to 50 in FIG. 10, the boundary value 1001 of 50 may be also changed in response to accumulation of the values used on the slider track. For example, the first boundary value may be smaller than 50 on the basis of the use of the larger number of values within the second section.

In operation 907, the processor 120 may receive user input for displaying a user interface including a slider track. Operation 907 may correspond to operation 501 of FIG. 5.

In operation 909, the processor 120 may display a slider, which can move within the slider track indicating settable values. Operation 909 may correspond to operation 203 of FIG. 2. In operation 909, the processor 120 may display the slider track on the basis of the size (length or ratio) at which each of the plurality of sections is changed and the changed interval in operation 903 and operation 905. For example, referring to FIG. 10, the processor 120 may display a slider track 1050 changed from the slider track 1000 in response to reception of user input for displaying the user interface in operation 907 on the basis of the change in the size and the interval for each of the plurality of sections. In FIG. 10, the slider that can move within the slider track is omitted.

Figure 11:
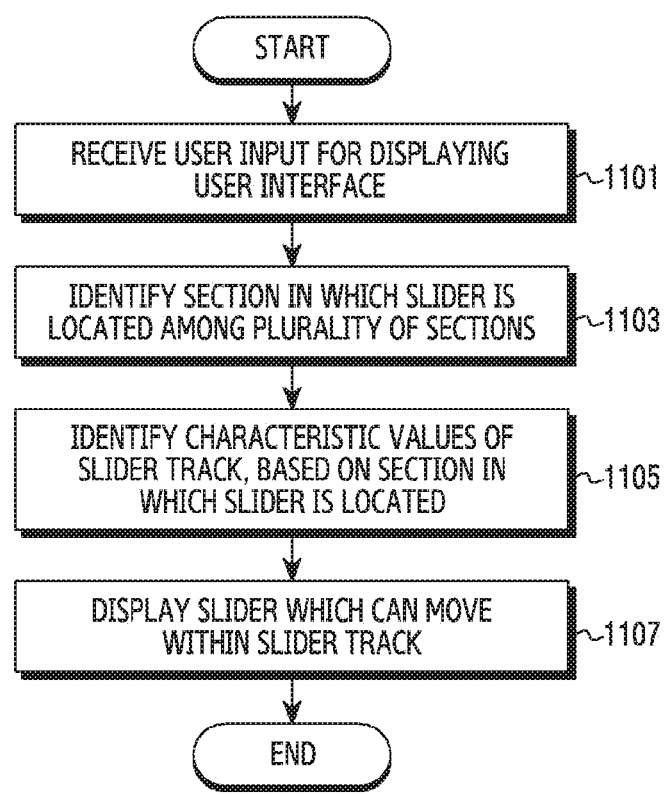
FIG. 11 illustrates an example of an operation in which the electronic device displays a slider track on the basis of a location of the slider according to various embodiments.
Figure 12:
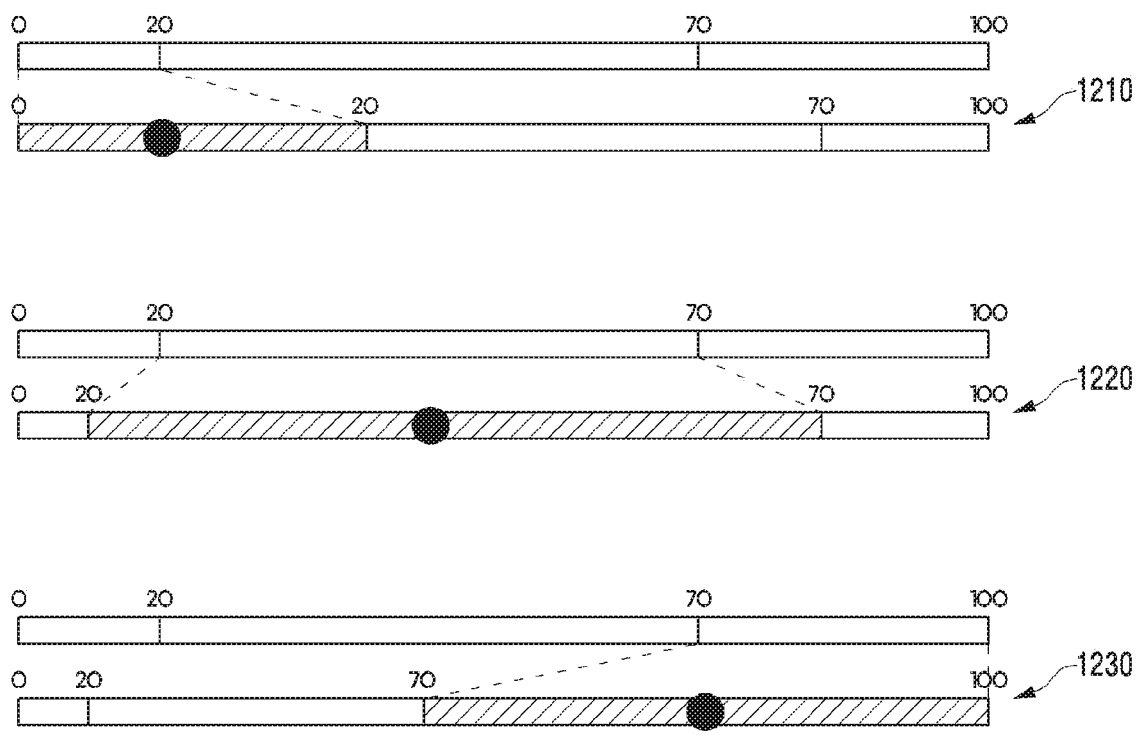
FIG. 12 illustrates an example of a slider track displayed in the electronic device on the basis of a location of a slider according to various embodiments.

FIG. 11 illustrates an example of operation in which the electronic device displays a slider track on the basis of the location of the slider according to various embodiments. FIG. 12 illustrates an example of a slider track displayed in the electronic device on the basis of the location of a slider according to various embodiments.

Referring to FIG. 11, in operation 1101, the processor 120 may receive user input for displaying a user interface for configuring setting values.

In operation 1103, the processor 120 may identify a section in which a slider is located among a plurality of sections on the basis of reception of the user input for displaying the user interface. For example, the processor 120 may identify the most recently stored setting value and identify that a section including the most recently stored setting value is the section in which the slider is located. In another example, the processor 120 may identify a predetermined setting value and identify that a section including the predetermined setting value is the section in which the slider is located. In still another example, when the slider moves on the basis of the user input, the processor 120 may identify a section in which the moved slider is located.

In operation 1105, the processor 120 may identify characteristic values of the slider track on the basis of identification of the section in which the slider is located. The characteristic values of the slider track may include one or more boundary values, which divide settable values into a plurality of sections, the size (length or ratio) of each of the plurality of sections, or an interval between settable values within each of the plurality of sections.

For example, referring to FIG. 12, the processor 120 may identify the size of each of the plurality of sections on the basis of identification of the section in which the slider is located. For example, although the minimum value of the settable values is 0, a first boundary value is 20, a second boundary value is 70, and a maximum value of settable values is 100, the ratio {size of first section:size of second section:size of third section} may not be {20:50:30} depending on the location of the slider.

The processor 120 may store data required for displaying one of a slider track 1210, a slider track 1220, and a slider track 1230 in the memory 130 on the basis of the section in which the slider is located. According to an embodiment, the processor 120 may store information on ratios of sizes of the plurality of sections depending on the section in which the slider is located. For example, the processor 120 may store the ratio (size of first section:size of second section:size of third section) in the case in which the slider is located in the first section. The same may apply to the case in which the slider is located in the second section or in the third section. In another example, the processor 120 may store coordinates of the first boundary value and coordinates of the second boundary value depending on the section in which the slider is located. For example, the processor 120 may store the coordinates of the first boundary value and the coordinates of the second boundary value in the case in which the slider is located in the first section. The same may apply to the case in which the slider is located in the second section or in the third section.

The processor 120 may identify the size of each of the plurality of sections stored in the memory 130 on the basis of the section in which the slider is located.

Although not illustrated in FIG. 12, the processor 120 may identify an interval between settable values within each of the plurality of sections on the basis of identification of the section in which the slider is located. For example, the memory 130 may store a first interval between settable values within the first section, a second interval between settable values within the second section, and a third interval between settable values within the third section depending on the section in which the slider is located. The processor 120 may identify the first interval, the second interval, and the third interval in the case in which the slider stored in the memory 130 is located in the first section on the basis of identification that the slider is located in the first section. For example, the processor 120 may identify the first interval that is smaller than the second interval and the third interval on the basis of identification that the slider is located in the first section. The processor 120 may identify the second interval that is smaller than the first interval and the third interval on the basis of identification that the slider is located in the second section.

In operation 1107, the processor 120 may display a slider track and a slider that can move within the slider track on the basis of the characteristic values of the identified slider track. Operation 1107 may correspond to operation 203 of FIG. 2.

For example, the processor 120 may display a slider track 1210 of which a first section is enlarged on the basis of identification that the slider is located in the first section among the plurality of sections. In the slider track 1210, the first interval may be narrower than the second interval and the third interval. The processor 120 may display a slider track 1220 of which the second section is enlarged on the basis of identification that the slider is located in the second section among the plurality of sections. In the slider track 1220, the second interval may be narrower than the first interval and the third interval. The processor 120 may display a slider track 1230 of which the third section is enlarged on the basis of identification that the slider is located in the third section among the plurality of sections. In the slider track 1230, the third interval may be narrower than the first interval and the second interval.

Figure 13:
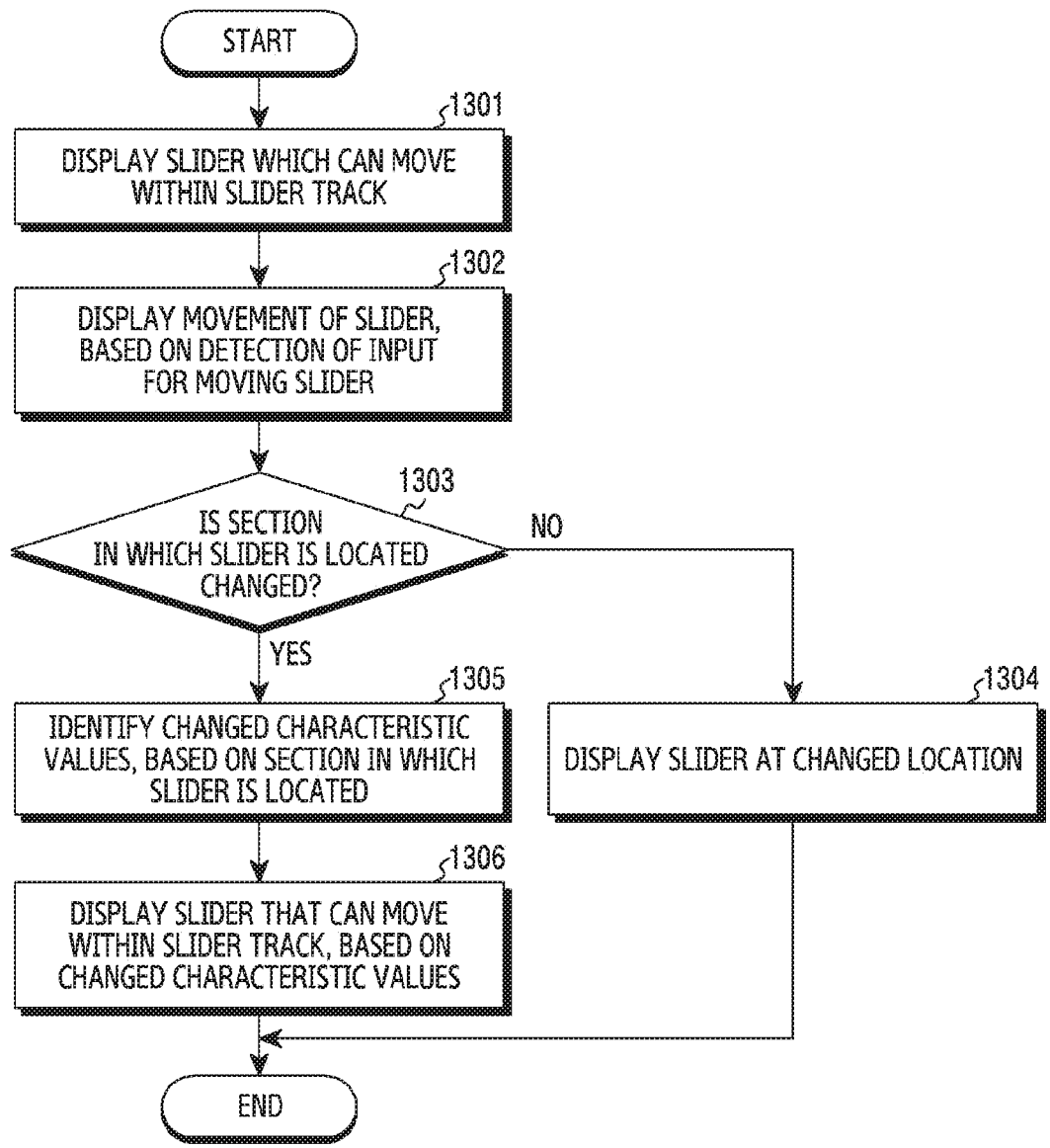
FIG. 13 illustrates an example in which the electronic device displays a slider track on the basis of movement of a slider according to various embodiments.
Figure 14:
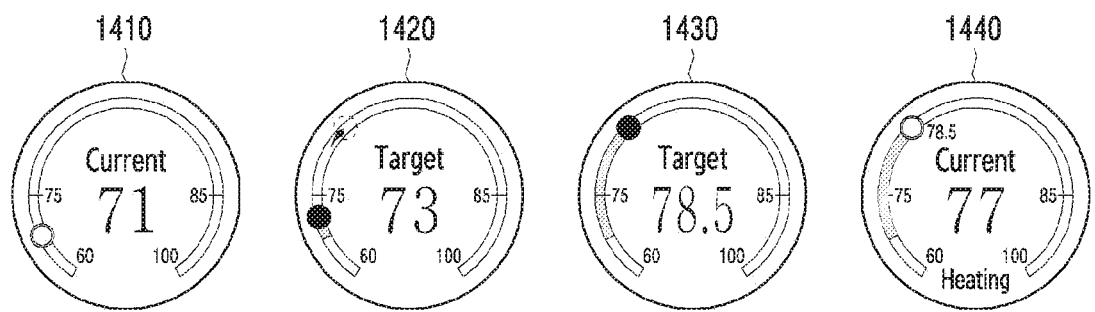
FIG. 14 illustrates an example of a user interface displayed in the electronic device on the basis of movement of a slider according to various embodiments.
Figure 15A:
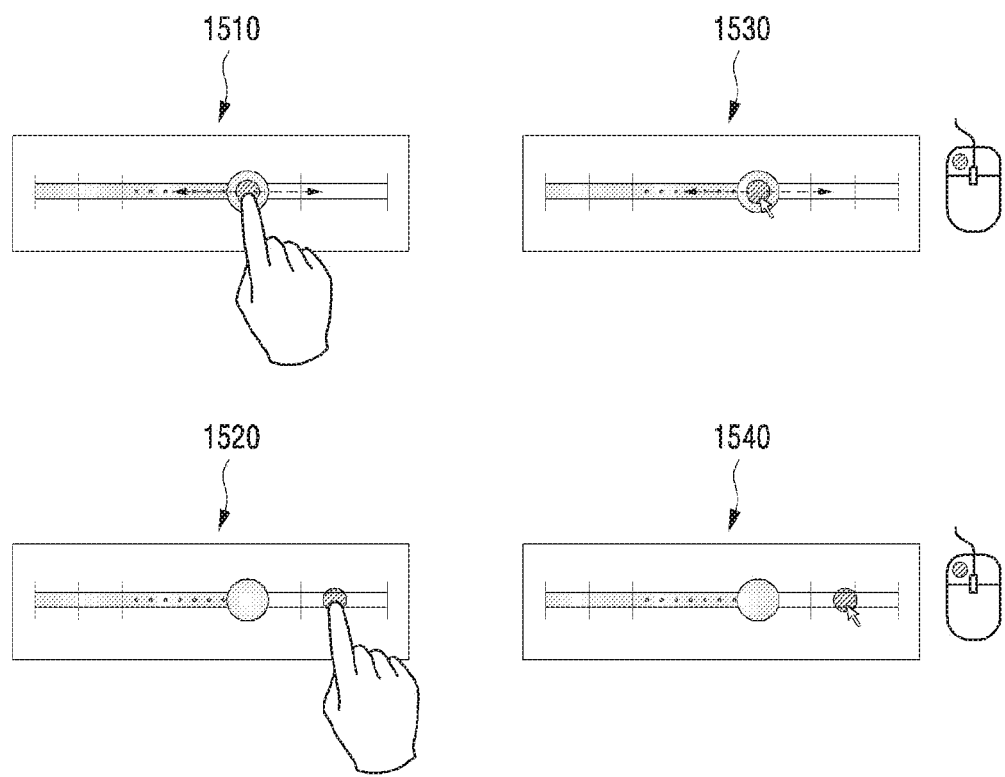
FIG. 15A illustrates an example of an input means for moving a slider.
Figure 15B:
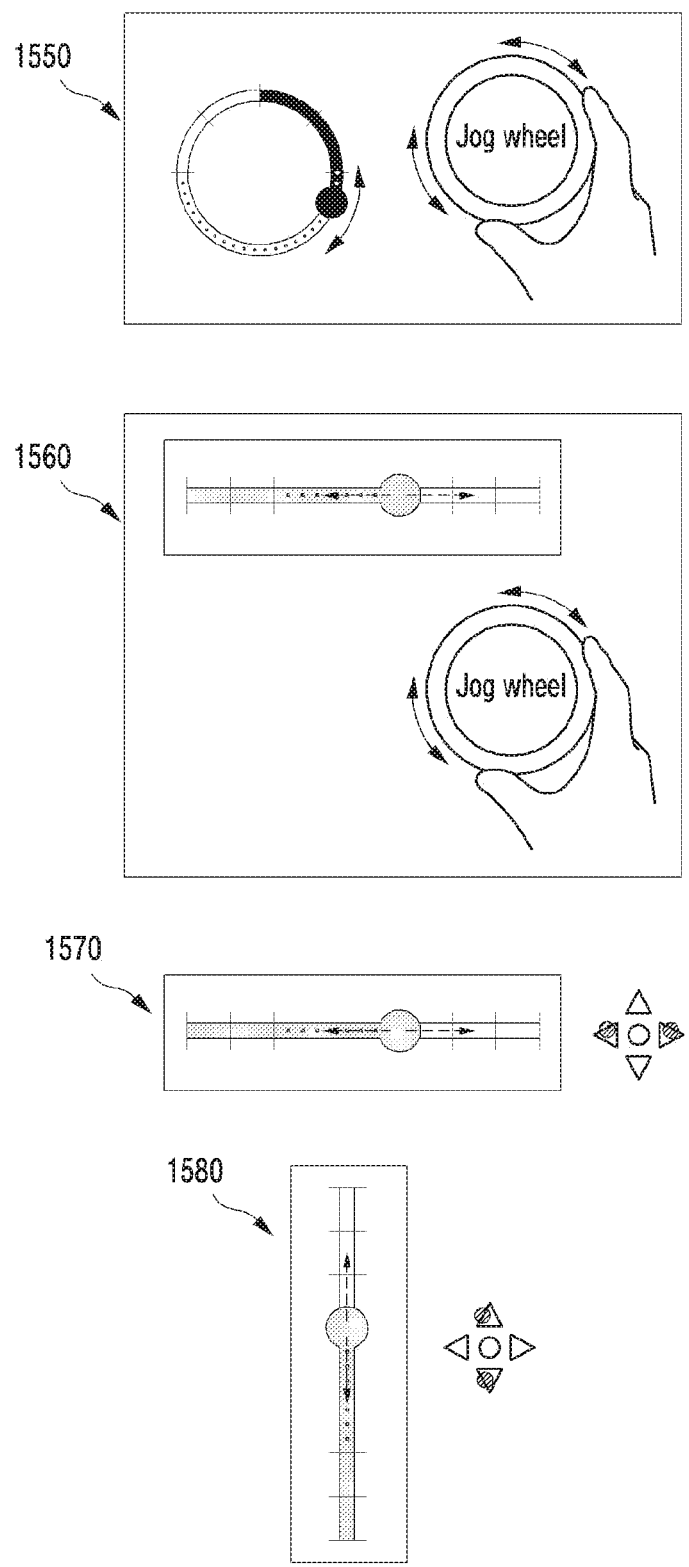
FIG. 15B illustrates another example of the input means for moving the slider.

FIG. 13 illustrates an example in which the electronic device displays a slider track on the basis of movement of a slider according to various embodiments. FIG. 14 illustrates an example of a user interface displayed in the electronic device on the basis of movement of a slider according to various embodiments. FIG. 15A illustrates an example of an input means for moving a slider. FIG. 15B illustrates another example of the input means for moving the slider.

Referring to FIG. 13, in operation 1301, the processor 120 may display a slider that can move within a slider track. Operation 301 may correspond to operation 203 of FIG. 2, operation 909 of FIG. 9, or operation 1107 of FIG. 11. The processor 120 may display a slider located in one of a plurality of sections within the slider track.

For example, referring to FIG. 14, the processor 120 may display a user interface 1410 including the slider which can move within the slider track. For example, the processor 120 may identify context information on the basis of display of the user interface 1410. The processor 120 may display the current temperature 71° F. within the user interface 1410 on the basis of identification that the current temperature is 71° F. The processor 120 may identify the current time as context information and identify that a section of temperature mainly set at the current time is from 75° F. to 85° F. The processor 120 may identify 75° F. and 85° F. as one or more boundary values on the basis of identification that the section of temperature mainly set at the current time is from 75° F. to 85° F. The processor 120 may identify the enlarged size of the section corresponding to a temperature from 75° F. to 85° F. on the basis of identification that the section in which the temperature is mainly set at the current time is from 75° F. to 85° F. The processor 120 may display the user interface 1410 on the basis of the one or more identified boundary values and the identified size of the plurality of sections. The processor 120 may display a slider located in a section including the current temperature 71° F. among the plurality of sections.

In operation 1302, the processor 120 may display movement of the slider on the basis of detection of input for moving the slider. For example, the processor 120 may display the moved slider as shown in the user interface 1420 on the basis of detection of the input of moving the slider within the user interface 1410.

For example, referring to FIG. 15A, the processor 120 may detect drag input for the slider through the touch circuitry 165 of the display 160 as shown in a block 1510. The processor 120 may detect a touch (or tap) input at a position on the slider track through the touch circuitry 165 as shown in a block 1520. The processor 120 may detect drag input for the slider through a mouse as the input device 150, as shown in a block 1530. The processor 120 may detect a click input at a position on the slider track through a mouse, as shown in a block 1540. The processor 120 may display movement of the slider on the basis of detection of the touch input, the tap input, the drag input, or the click input for moving the slider. The processor 120 may identify a setting value or coordinates corresponding to the location at which the user input is received.

In another example, referring to FIG. 15B, the processor 120 may detect input for moving the slider through a jog wheel as the input device 150, as shown in a block 1550 or a block 1560. The processor 120 may display the slider moving in a direction corresponding to the direction of the jog wheel within the slider track. The processor 120 may detect input for moving the slider through a remote control as the input device 150, as shown in a block 1570 or a block 1580. The processor 120 may display the slider moving in a direction corresponding to the direction of the input of the remote control within the slider track.

In operation 1303, the processor 120 may determine whether a section in which the slider is located is changed.

In operation 1304, when the section in which the slider is located is not changed, the processor 120 may display the slider at the changed location. For example, referring to FIG. 14, the processor 120 may identify that the slider is located in the first section in the user interface 1410 and identify that the section (that is, the first section) in which the slider is located in the user interface 1420 is not changed. The processor 120 may display the slider at the changed location within the first section on the basis of characteristic values of the slider track in the case in which the slider is located in the first section. For example, the processor 120 may display the slider of which the setting value is changed by 1° F. in the first section on the basis of identification that the interval between settable values within the first section is 1° F. The processor 120 may display the slider at a location corresponding to the setting value 73° F. within the user interface 1420.

In operation 1305, when the section in which the slider is located is changed, the processor 120 may identify characteristic values of the changed slider track on the basis of the section in which the slider is located. For example, the processor 120 may identify one or more boundary values, the size of each of the plurality of sections, or the interval between settable values within each of the plurality of sections on the basis of the section in which the slider is located.

For example, referring to FIG. 14, the processor 120 may identify that the section in which the slider is located is changed from the first section to the second section in the user interface 1430. The processor 120 may identify characteristic values of the changed slider track on the basis of identification that the section in which the slider is located is changed to the second section. For example, the processor 120 may identify that the interval between settable values within the second section is 0.5° F.

In operation 1306, the processor 120 may display the slider that can move within the changed slider track on the basis of identification of the changed characteristic values. For example, the processor 120 may display the slider that can move with the changed slider track on the basis of one or more identified boundary values, the size of each of the plurality of sections, and the interval between settable values within each of the plurality of sections.

For example, the processor 120 may display the slider of which the setting value is changed by 0.5° F. within the slider track on the basis of identification that the interval between settable values within the second section in the user interface 1430 is 0.5° F. The processor 120 may configure the setting value to be 78.5° F. on the basis of detection of a tap input at the location corresponding to the setting value 78.5° F. or detection of release of a drag for the slider at the location corresponding to the setting value 78.5° F. in the user interface 1430. The processor 120 may display the slider at the location corresponding to the setting value 78.5° F. within the user interface 1430. The processor 210 may simultaneously display the setting value 78.5° F. and the current temperature 77° F. within the user interface 1430.

Figure 16:
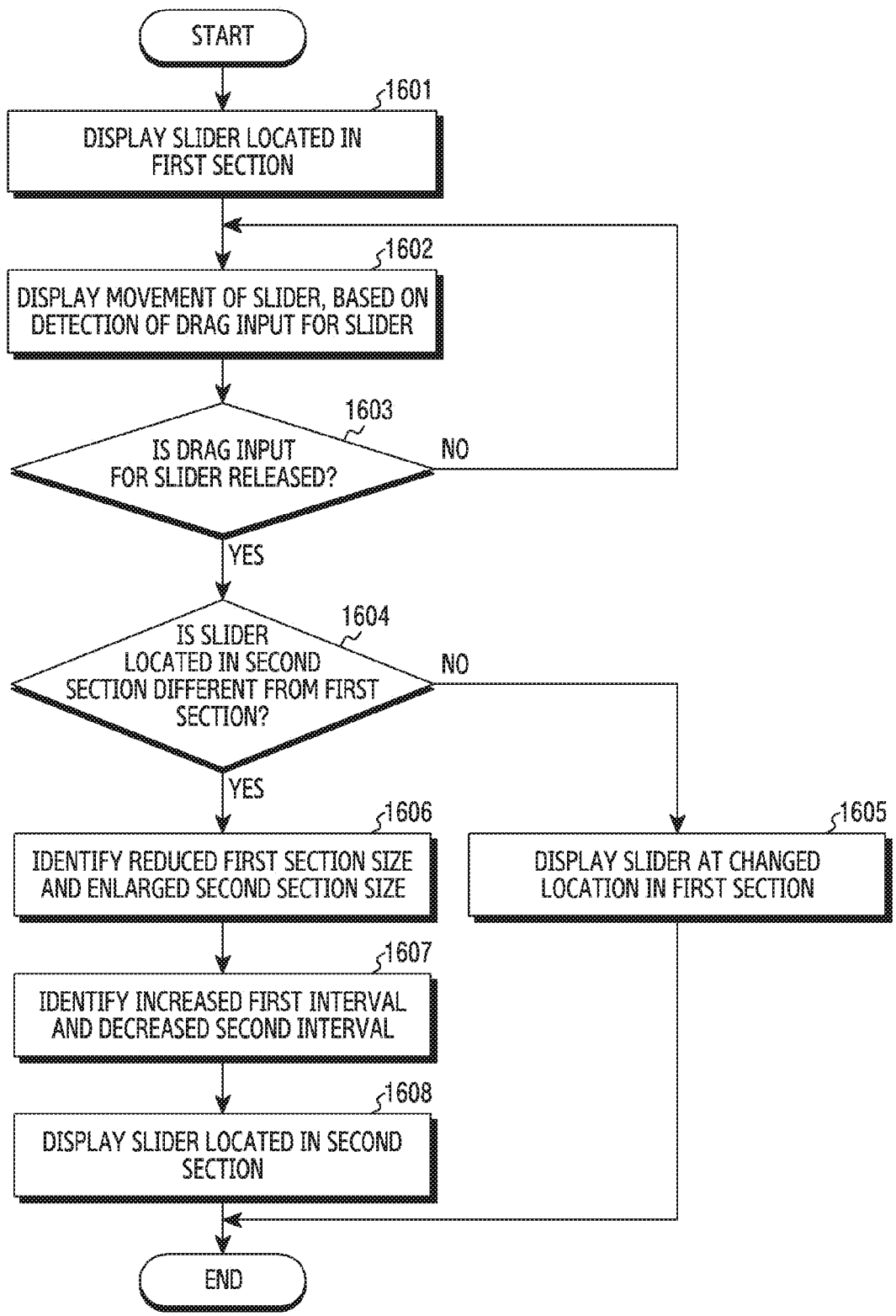
FIG. 16 illustrates another example of the operation in which the electronic device displays a slider track on the basis of movement of a slider according to various embodiments.
Figure 17:
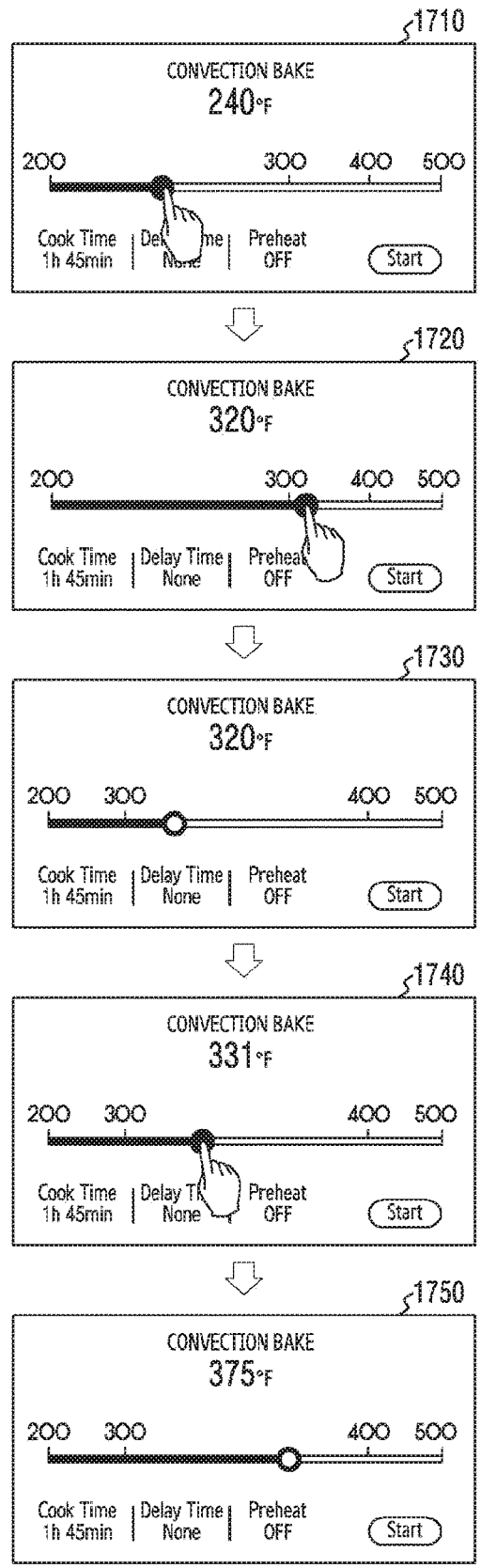
FIG. 17 illustrates another example of the user interface displayed in the electronic device on the basis of movement of a slider according to various embodiments.

FIG. 16 illustrates another example of the operation in which the electronic device displays a slider track on the basis of movement of a slider according to various embodiments. FIG. 17 illustrates another example of the user interface displayed in the electronic device on the basis of movement of a slider according to various embodiments.

Referring to FIG. 16, in operation 1601, the processor 120 may display a slider located in a first section among a plurality of sections. For example, referring to FIG. 17, the processor 120 may display a user interface 1710 for configuring a temperature for cooking foods. The processor 120 may store 200° F. as a minimum value, 300° F. as a first boundary value, 400° F. as a second boundary value, and 500° F. as a maximum value in the memory 130 in order to display the user interface 1710. Among settable values within the user interface 1710, the first section may correspond to a temperature from 200° F. to 300° F., the second section may correspond to a temperature from 300° F. to 400° F., and the third section may correspond to a temperature from 400° F. to 500° F. The processor 120 may display a slider located, for example, in the first section within the user interface 1710.

In operation 1602, the processor 120 may display movement of the slider on the basis of detection of drag input for the slider. For example, the processor 120 may display the user interface 1720 in which the slider is moved on the basis of detection of the drag input for the slider.

In operation 1603, the processor 120 may identify whether the drag input for the slider is released. The processor 120 may repeat operation 1602 on the basis of identification that the drag input for the slider is not released. When the drag input for the slider is not released, the processor 120 may display movement of the slider based on the drag input.

In operation 1604, the processor 120 may identify whether the slider is located in the second section, different from the first section, in response to detection of release of the drag input for the slider.

In operation 1605, the processor 120 may display the slider at the changed location within the first section on the basis of identification that the slider is still located in the first section. When the section in which the slider is located is not changed, the processor 120 may not change characteristic values of the slider track. That is, the size of the first section, the size of the second section, a first interval for the first section, and a second interval for the second section may be maintained. Accordingly, the processor 120 may display the slider at the changed location within the first section without changing the display of the slider track.

When it is identified that the slider is located in the second section, different from the first section, in response to identification that the drag input for the slider is released in operation 1603, the processor 120 may proceed to operation 1606 and operation 1607 and identify characteristic values of the changed slider track. For example, the processor 120 may identify the changed size of the first section, the changed size of the second section, the changed first interval for the first section, and the changed second interval for the second section.

In operation 1606, the processor 120 may identify the reduced size of the first section and the enlarged size of the second section on the basis of identification that the slider is located in the second section when the drag input is released.

For example, referring to FIG. 17, the processor 120 may not change the size of the first section and the size of the second section as shown in a user interface 1720 before the drag input for the slider is released. The processor 120 may identify the reduced size of the first section and the enlarged size of the second section in order to display a user interface 1730 in response to identification that the drag input for the slider is released in the user interface 1720. The processor 120 may identify the reduced size of the first section and the enlarged size of the second section stored in the memory 130. According to the section in which the slider is located, it is possible to increase user convenience by adaptively increasing the ratio of the section in which the slider is located within the slider track.

In operation 1607, the processor 120 may identify a first interval increased for the first section and a second interval reduced for the second section on the basis of identification that the slider is located in the second section when the drag input is released.

For example, referring to FIG. 17, the processor 120 may not change the second interval for the second section in the user interface 1720 before the drag input for the slider is released. In the user interface 1720 before the drag input for the slider is released, for example, the second interval may correspond to 10. Accordingly, when the drag input for the slider is moved to the right in the user interface 1720, the setting value may be changed to 300° F., 310° F., or 320° F. The processor 120 may identify the first interval, which has become wider, and the second interval, which has become narrower, in order to display the user interface 1730 in response to identification that the drag input for the slider is released in the user interface 1720. That is, in the user interface 1710 and the user interface 1720, the first interval may correspond to 1° F. and the second interval may correspond to 10° F. In the user interface 1730, the first interval may correspond to 10 and the second interval may correspond to 1. According to the section in which the slider is located, it is possible to increase user convenience by adaptively narrowing the interval between settable values within the section in which the slider is located.

Operation 1606 and operation 1607 may be changed in sequence, or may be performed simultaneously or in parallel. Depending on the embodiment, only one of operation 1606 and operation 1607 may be performed.

In operation 1608, the processor 120 may display the slider located in the second section on the basis of the identification. For example, the processor 120 may display the user interface 1730 on the basis of identification of the changed size of the first section, the changed size of the second section, the changed first interval, and the changed second interval. The user interface 1730 may have an enlarged second section and a narrower second interval compared to the user interface 1710 and the user interface 1720.

For example, the processor 120 may display a user interface 1740 on the basis of redetection of the drag input for moving the slider to the right in the user interface 1730. That is, the processor 120 may display the slider moving to the right within the second section on the basis of the changed second interval. Since the changed second interval corresponds to 1° F., the setting value may be changed to 329° F., 330° F., or 331° F. when the slider moves to the right in the user interface 1740. The processor 120 may display a user interface 1750 in which the setting value is finally configured to be 375° F. on the basis of detection of release of the drag input for the slider.

Figure 18:
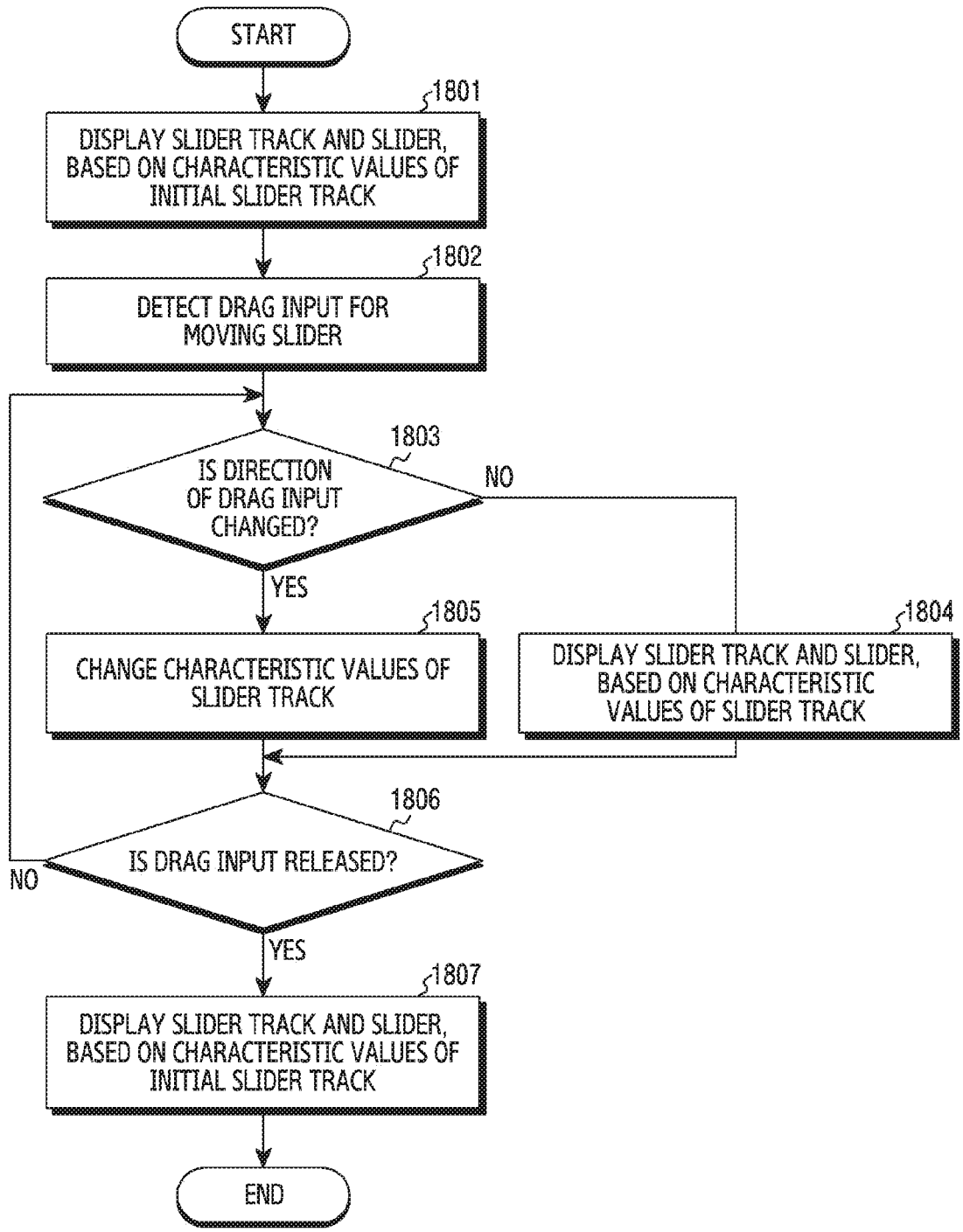
FIG. 18 illustrates an example of an operation in which the electronic device changes characteristic values of the slider track on the basis of a change in a movement direction of a slider according to various embodiments.
Figure 19:
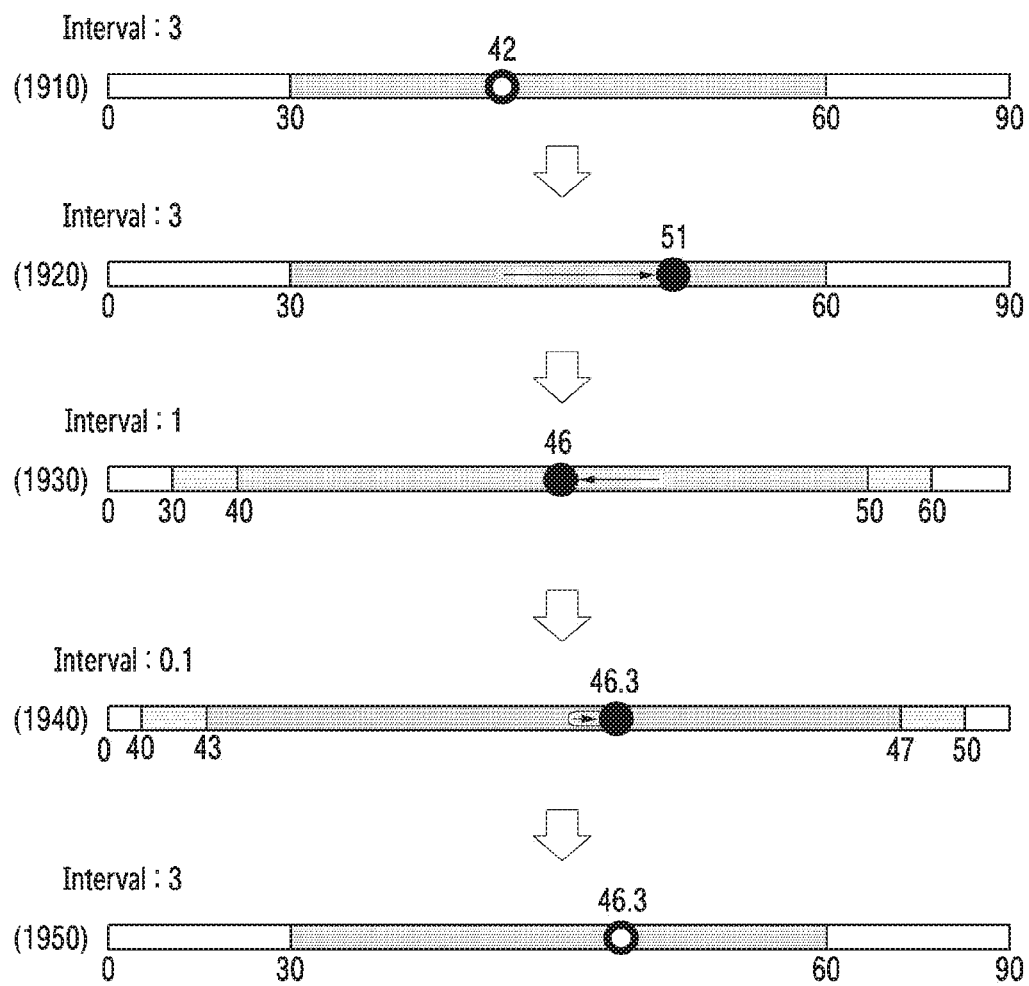
FIG. 19 illustrates an example of a slider track displayed in the electronic device on the basis of a change in a movement direction of a slider according to various embodiments.
Figure 20:
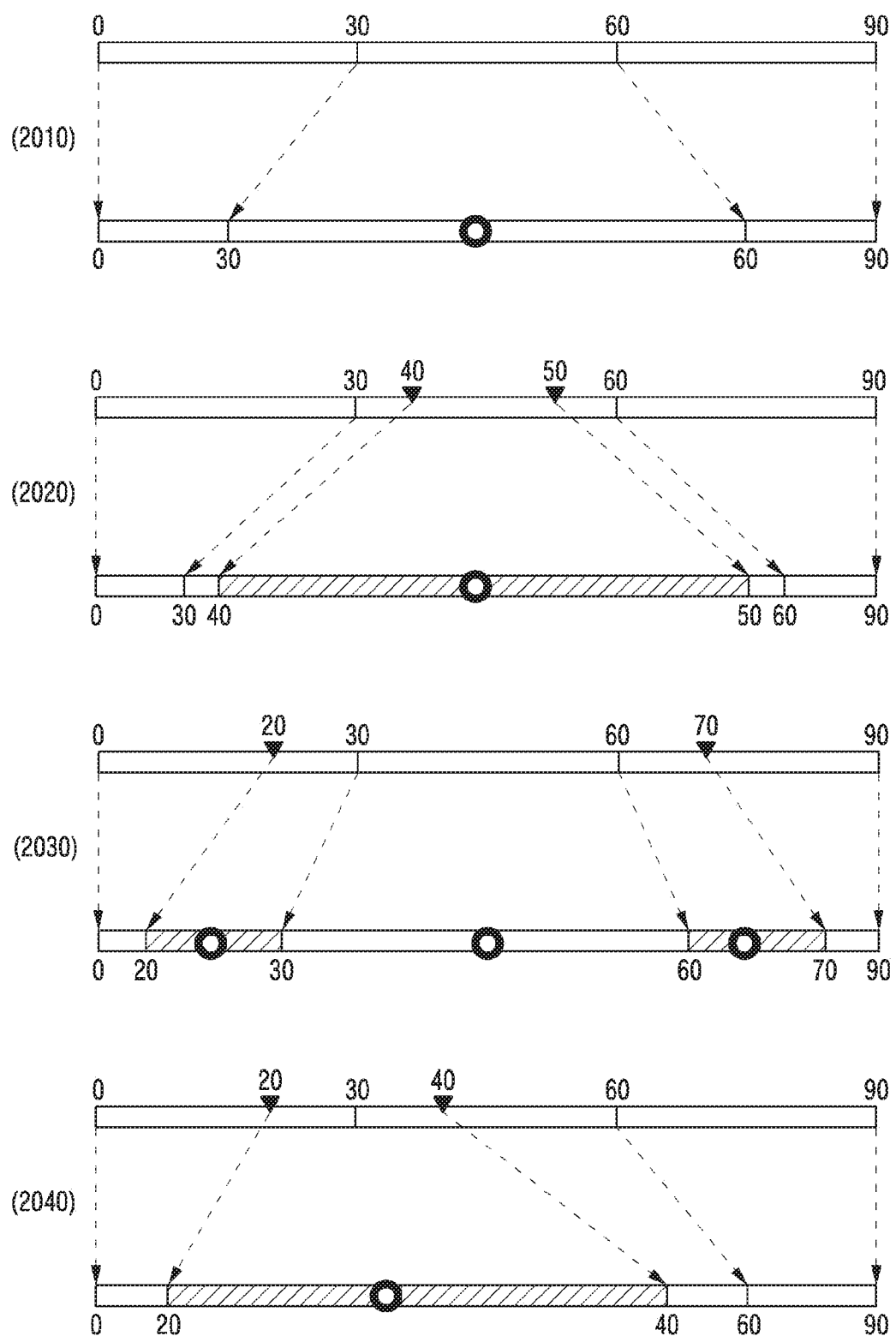
FIG. 20 illustrates various examples of a slider track displayed in the electronic device on the basis of a change in characteristic values of the slider track according to various embodiments.

FIG. 18 illustrates an example of the operation in which the electronic device changes characteristic values of the slider track on the basis of a change in a movement direction of a slider according to various embodiments. FIG. 19 illustrates an example of a slider track displayed in the electronic device on the basis of a change in a movement direction of a slider according to various embodiments. FIG. 20 illustrates various examples of a slider track displayed in the electronic device on the basis of a change in characteristic values of the slider track according to various embodiments.

Referring to FIG. 18, in operation 1801, the processor 120 may display a slider track and a slider on the basis of characteristic values of the initial slider track. For example, the processor 120 may identify characteristic values of the initial slider track in response to reception of user input for displaying a user interface including the slider track and the slider. The processor 120 may display the slider track and the slider on the basis of the identified characteristic values of the initial slider track. The characteristic values of the slider track may include one or more boundary values, the size (length or ratio) of each of a plurality of sections, or an interval between settable values within each of the plurality of sections.

For example, referring to FIG. 19, the processor 120 may identify characteristic values of an initial slider track 1910 in order to display the slider track 1910 before drag input for the slider is detected. The characteristic values of the initial slider track may indicate characteristic values of the slider track displayed before the drag input for the slider is detected.

For example, the processor 120 may identify, from data stored in the memory 130, that the minimum value of the slider track 1910 is 0, a first boundary value of the slider track 1910 is 30, a second boundary value of the slider track 1910 is 60, and the maximum value of the slider track 1910 is 90. The processor 120 may identify the size of a first section (for example, a section from 0 to 30), the size of a second section (for example, a section from 30 to 60), and the size of a third section (for example, a section from 60 to 90) within the slider track. The processor 120 may display the slider track 1910 on the basis of the identification. The processor 120 may identify, as the characteristic values of the initial slider track 1910, the interval between settable values within a section (for example, the second section) in which the slider is located. The processor 120 may identify that the interval between settable values within the section in which the slider is located is 3 and that the setting value of the slider is 42 on the slider track 1910. The setting value 42 of the slider may be determined to be one of the settable values 30, 33, 36, 39, 42, and 45 within the section in which the slider is located on the basis of the interval 3.

In operation 1802, the processor 120 may detect a drag input for moving the slider. For example, referring to FIG. 19, the processor 120 may detect a drag input for moving the slider to the right within the slider track 1910.

In operation 1803, the processor 120 may identify whether the direction of the drag input is changed.

In operation 1804, the processor 120 may display the slider track and the slider on the basis of characteristic values of the slider track through identification that the direction of the drag input is not changed. For example, referring to FIG. 19, the processor 120 may display the slider track 1920 on the basis of characteristic values of the slider track 1910 through identification that the direction of the drag input is not changed. The processor 120 may display the slider track 1920 on the basis of the characteristic values of the slider track 1910 identified in operation 1801. The processor 120 may display the slider track 1920 on the basis of the size of the first section, the size of the second section, and the size of the third section identified in operation 1801. The processor 120 may display a slider of which the setting value increases by 3 according to movement of the drag input to the right on the basis of the interval 3 identified in operation 1801. The processor 120 may sequentially increase the setting value of the slider moving to the right to 42, 45, 48, and 51 on the basis of the characteristic values of the slider track 1910 identified in operation 1801.

In operation 1805, the processor 120 may change the characteristic values of the slider track on the basis of identification that the direction of the drag input is changed. For example, referring to FIG. 19, the processor 120 may change the characteristic values of the slider track in order to display a slider track 1930 on the basis of identification that the direction of the drag input is changed from right to left.

For example, the processor 120 may increase the number of a plurality of sections. For example, the processor 120 may add a new boundary value to the existing first boundary value (that is, 30) and second boundary value (that is, 60). The processor 120 may add new boundary values 40 and 50 in order to display the slider track 1930. The processor 120 may increase the number of the plurality of sections from 3 to 5 by adding the new boundary values. The processor 120 may identify the changed size (length or ratio) of each of the plurality of sections in order to display the slider track 1930. The processor 120 may enlarge the size of the sections (for example, sections from 40 to 50) including the slider in order to minutely control the setting values of the slider.

In another example, the processor 120 may reduce the interval between settable values within the section in which the slider is located. For example, the processor 120 may identify an interval 1 reduced from the existing interval 3 in order to display the slider track 1930 on the basis of the change in the direction of the drag input. The processor 120 may reduce the interval of the section (for example, the section from 40 to 50) including the slider in order to minutely control the setting values of the slider. The processor 120 may change the setting value of the slider moving to the left in the order of 51, 50, 49, 48, 47, and 46 on the basis of the reduced interval 1.

In operation 1806, the processor 120 may identify whether the drag input is released. The processor 120 may identify whether the direction of the drag input is changed in operation 1803 on the basis of identification that the drag input is not released. Operation 1803 to operation 1806 may be repeatedly performed before the drag input is released.

For example, on the basis of identification that the drag input is not released in operation 1806 and identification that the direction of the drag input is not changed in operation 1803, the processor 120 may proceed to operation 1804 again and display the slider track and the slider on the basis of characteristic values of the slider track. For example, referring to FIG. 19, the processor 120 may display the slider moving within the slider track 1930 on the basis of characteristic values of the slider track 1930 unless the direction of the drag input is changed from left to right again on the slider track 1930. The processor 120 may display a slider of which the setting value decreases by one according to the left drag input on the basis of the interval 1 among the characteristic values of the slider track 1930.

In operation 1803, the processor 120 may proceed to operation 1805 and change the characteristic values of the slider track again on the basis of identification that the direction of the drag input is changed. For example, referring to FIG. 19, the processor 120 may change again the characteristic values of the slider track in order to display a slider track 1940 on the basis of identification that the direction of the drag input is changed from left to right on the slider track 1930.

For example, the processor 120 may change one or more boundary values. The processor 120 may change positive boundary values of the section including the slider in order to minutely control the setting value of the slider. The processor 120 may identify boundary values 40, 43, 47, and 50 of the slider track 1940 changed from the boundary values 30, 40, 50, and 60 of the slider track 1930. By changing the positive boundary values 40 and 50 of the section in which the slider is located to 43 and 47, the setting value of the slider may be minutely controlled.

In another example, the processor 120 may reduce the interval between settable values within the section in which the slider is located. For example, the processor 120 may identify an interval 0.1 reduced from the existing interval 1 in order to display the slider track 1940 on the basis of the change in the direction of the drag input from left to right. The processor 120 may reduce the interval of the section (for example, the section from 43 to 47) including the slider in order to minutely control the setting values of the slider. The processor 120 may sequentially change the setting value of the slider moving to the right to 46, 46.1, 46.2, and 46.3 on the basis of the reduced interval 0.1.

According to various embodiments, the processor 120 may change one or more of various characteristic values of the slider track on the basis of identification that the direction of the drag input is changed. The processor 120 may change one or more of the interval between settable values within the section in which the slider is located, one or more boundary values, the number of the plurality of sections, or the size of the plurality of sections in order to minutely control the setting value of the slider on the basis of identification that the direction of the drag input is changed.

According to some embodiments, the processor 120 may narrow the interval between settable values within the section in which the slider is located in order to minutely control the setting value of the slider. According to other embodiments, the processor 120 may change the positive boundary values of the section in which the slider is located in order to minutely control the setting value of the slider. According to other embodiments, the processor 120 may increase the number of the plurality of sections by adding new boundary values to the one or more boundary values. For example, a new section including the slider may be added (or generated). According to other embodiments, the processor 120 may enlarge the size of the section including the slider among the plurality of sections. According to other embodiments, the processor 120 may first increase the number of the plurality of sections according to the change in the direction of the drag input, and when the number of changes in the direction of the drag input is larger than a predetermined number, only the one or more boundary values may be changed while the number of plurality of sections is maintained.

For example, referring to FIG. 20, the processor 120 may change only the size of each of the plurality of sections while maintaining the plurality of sections, as shown in a block 2010. In another example, the processor 120 may increase the number of plurality of sections by adding a new section (that is, a section from 40 to 50), as shown in a block 2020. Referring to the block 2020, the new section (that is, the section from 40 to 50) may be included in the existing section (that is, the section from 30 to 40).

In still another example, the processor 120 may add (or generate) a new section outside the existing section (that is, the section from 30 to 60) as shown in a block 2030. Referring to the block 2030, the slider track may include a plurality of sliders depending on the circumstances. For example, the processor 120 may identify the plurality of sections or the size of each of the plurality of sections on the basis of the location of each of the plurality of sliders. The processor 120 may enlarge the size of each of the plurality of sections in which each of the plurality of sliders is located in order to minutely control each of the plurality of sliders. For example, the processor 120 may further enlarge a first section, in which a first slider is located, a second section, in which a second slider is located, and a third section, in which a third slider is located, compared to the remaining sections (for example, a fourth section and a fifth section).

In yet another example, the processor 120 may generate a new section (that is, a section from 20 to 40) between the existing sections, as shown in a block 2040. For example, when the direction of the drag input is changed near the boundary value 30, the processor 120 may remove (or temporarily remove) the boundary value 30 and generate the new section (that is, a section from 20 to 40) including the boundary value 30.

In operation 1806, the processor 120 may identify whether the drag input is released. The processor 120 may display a slider track (for example, a slider track 1950) and a slider on the basis of identification that the drag input is released and the characteristic values of the initial slider track in operation 1807.

For example, referring to FIG. 19, the processor 120 may identify that the drag input is released in the state in which the setting value of the slider is configured to be 46.3 on the slider track 1940. The processor 120 may display a slider track 1950 in response to identification of release of the drag input. For example, the processor 120 may remove temporarily stored characteristic values of the slider track 1930 and characteristic values of the slider track 1940 on the basis of identification that the drag input is released. The processor 120 may display the slider track 1950 on the basis of the characteristic values of the initial slider track 1910. The processor 120 may display the slider indicating the setting value 46.3 within the slider track 1950 displayed on the basis of the initial characteristic values.

Figure 21:
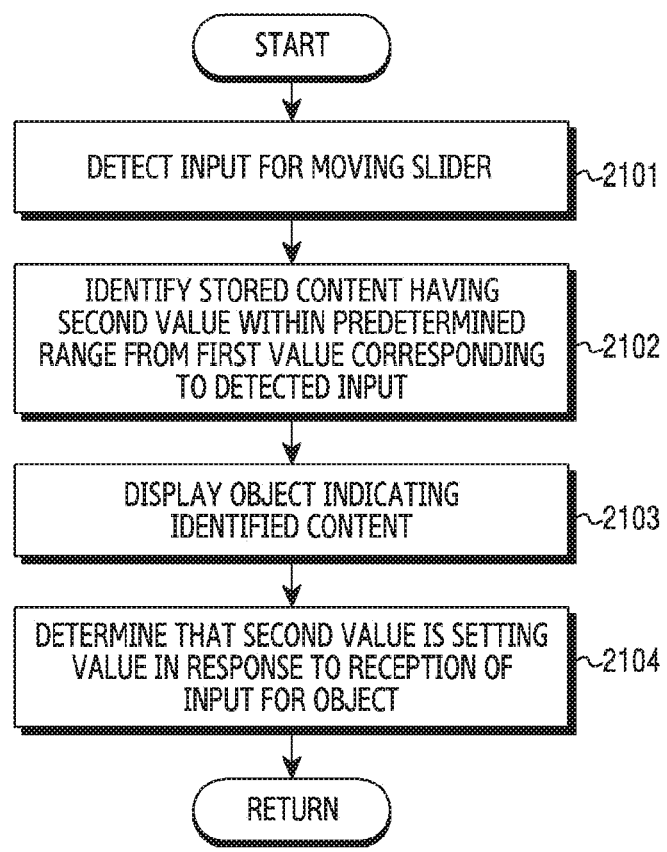
FIG. 21 illustrates an example of an operation in which the electronic device displays information stored in a slider track according to various embodiments.
Figure 22:
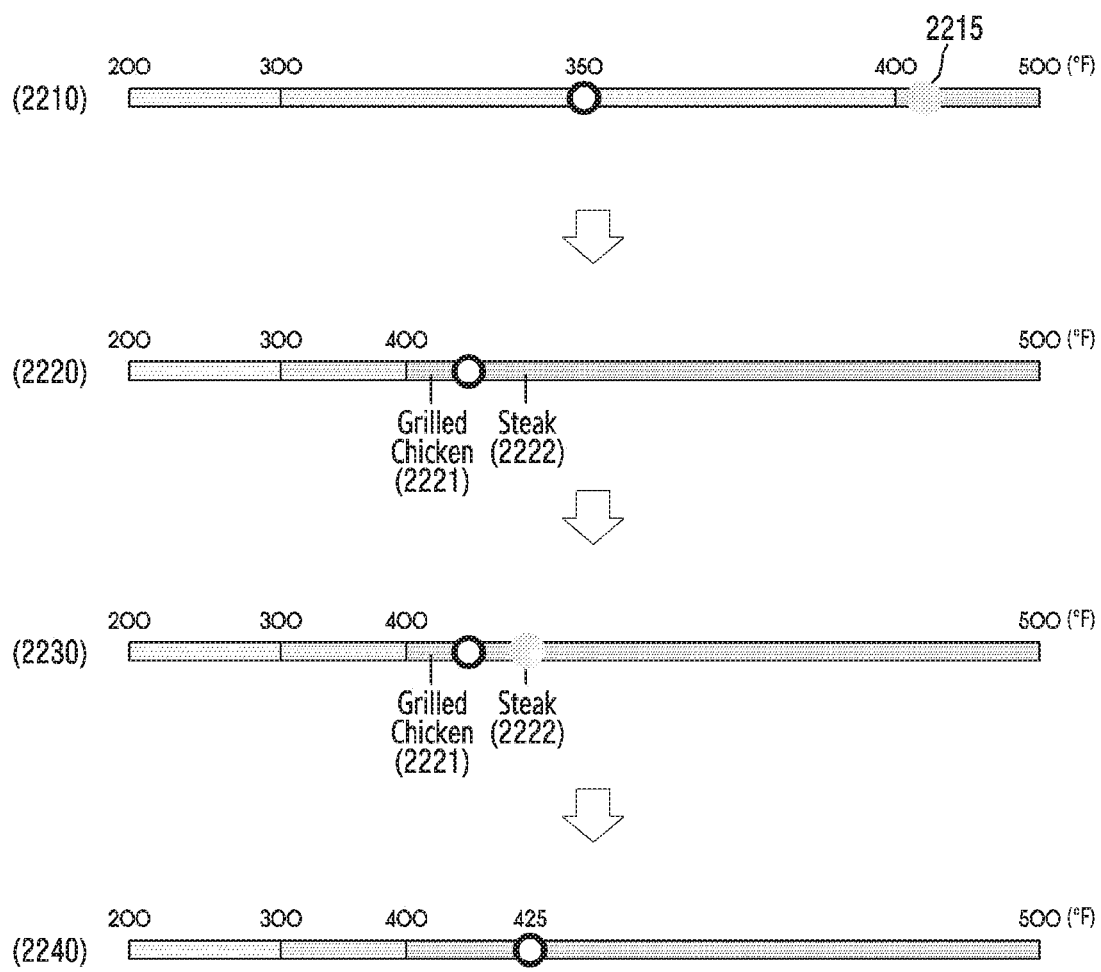
FIG. 22 illustrates an example of a slider track displaying stored information in the electronic device according to various embodiments.

FIG. 21 illustrates an example of the operation in which the electronic device displays information stored in a slider track according to various embodiments. FIG. 22 illustrates an example of a slider track displaying stored information in the electronic device according to various embodiments.

Referring to FIG. 21, in operation 2101, the processor 120 may detect input for moving a slider. The processor 120 may detect drag input for the slider or a touch (or tap) input at a position on the slider track in order to move the slider.

For example, referring to FIG. 22, a slider track 2210 to a slider track 2240 may be displayed through a user interface for configuring the temperature of an oven to cook foods. The slider track 2210 to the slider track 2240 may include a first section corresponding to a temperature range from 200° F. to 300° F., a second section corresponding to a temperature range from 300° F. to 400° F., and a third section corresponding to a temperature range from 400° F. to 500° F.

The processor 120 may display a slider located in the second section within the slider track 2210. The processor 120 may identify characteristic values of the slider track 2210 on the basis of identification that the slider is located in the second section. For example, the processor 120 may identify the ratio of the size of the second section to be high within the slider track 2210 on the basis of identification that the slider is located in the second section.

The processor 120 may detect input for moving the slider located in the second section to the third section. For example, the processor 120 may detect a touch (or tap) input for an area 2215 on the slider track 2210.

In operation 2102, the processor 120 may identify stored content having a second value within a predetermined range from a first value corresponding to the detected input. The processor 120 may identify stored content having a second value within a predetermined range from a first value corresponding to the detected input in response to detection of the input for moving the slider.

For example, referring to FIG. 22, the processor 120 may identify that the first value, corresponding to the detected input in the slider track 2210, is 410° F. The processor 120 may identify whether content having a second value within a predetermined range (for example, 20° F.) from a first value of 410° F. corresponding to the detected input is stored.

For example, the memory 130 may store one or more pieces of content (or information) related to the slider track. The content related to the slider track may be associated with one setting value among settable values within the slider track. For example, in connection with the slider track illustrated in FIG. 22, the processor 120 may store first content of "Grilled Chicken" having a setting value of 405° F. in the memory 130. The first content may indicate that the temperature for cooking "Grilled Chicken" is 405° F. In connection with the slider track illustrated in FIG. 22, the processor 120 may store second content of "Steak" having a setting value of 425° F. in the memory 130. The second content may indicate that temperature for cooking "Steak" is 425° F. The processor 120 may store a plurality of pieces of content including the first content and the second content in the memory 130. The plurality of pieces of content may be stored on the basis of user input or use by the user.

The processor 120 may identify "Grilled Chicken" having a setting value of 405° F. and "Steak" having a setting value of 425° F. within a predetermined range (for example, 20° F.) from a first value (for example, 410° F.) corresponding to the detected input in the slider track 2210.

In operation 2103, the processor 120 may display an object indicating identified content. For example, referring to FIG. 22, the processor 120 may display a slider track 2220 including a first object 2221 indicating the identified first content (for example, "Grilled Chicken") and a second object 2222 indicating the identified second content (for example, "Steak").

In operation 2104, the processor 120 may configure the second value as the setting value in response to reception of input for the object. For example, referring to FIG. 22, the processor 120 may receive input for the second object 2222 in the slider track 2230. The processor 120 may configure the temperature of an oven to be 425° F., which is a value associated with the second object 2222, in response to reception of input for the second object 2222. The processor 120 may display a slider track 2240 in response to reception of input for the second object 2222. The processor 120 may move the slider to a location corresponding to the second object 2222, as shown in the slider track 2240, in response to reception of input for the second object 2222.

According to some embodiments, when input pertaining to the object indicating the content is not detected for a predetermined time, the processor 120 may make the object displayed on the slider track disappear. For example, when input pertaining to the slider track 2220 is not detected for a predetermined time, the processor 120 may make the indications of "Grilled Chicken" and "Steak" disappear.

According to some embodiments, the processor 120 may make the object displayed on the slider track 2240 disappear as shown in the slider track 2240 on the basis of reception of input for the object indicating the content.

A method of operating the electronic device (for example, the electronic device 101) according to various embodiments may include an operation of identifying one or more boundary values (for example, 302 and 303), which divide settable values into a plurality of sections (for example, 310, 320, 330, 1010, 1020, 1060, and 1070) on the basis of context information related to the electronic device, and an operation of displaying a slider (for example, 395), which can move within a slider track (for example, 390, 1000, or 1050) indicating settable values through the display (for example, the display 160) of the electronic device. A first interval (for example, 1015 or 1065) between settable values within a first section (for example, 1010 or 1060) among the plurality of sections may be different from a second interval (for example, 1025 or 1075) between settable values within a second section (for example, 1020 or 1070) among the plurality of sections.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a display; and
a processor configured to:
identify one or more boundary values that divide settable values into a plurality of sections based on context information related to the electronic device, wherein the context information includes at least one of a usage record of the settable values or a current time,
identify at least two intervals of the plurality of sections based on the context information,
display a slider track divided into the plurality of sections and a slider that can move within the slider track and indicates a value corresponding to a position of the slider within the slider track through the display, wherein the slider track indicates a first settable value range of the settable values,
receive a drag input to the slider to change the value indicated by the slider,
identify a change of a direction of a movement of the slider based on the drag input,
in response to identifying the change of the direction from a first direction to a second direction different from the first direction and parallel to the slider track while the drag input is received:
decrease an interval of the settable values based on a first interval,
add a first section by adding at least one boundary value within the slider track, and
expand a portion corresponding to a second settable value range narrower than the first settable value range, within the slider track,
after the slider is moved to the second direction, in response to identifying a second change of the direction from the second direction to a third direction different from the second direction and parallel to the slider track while the drag input is received:
decrease an interval of the settable values based on a second interval,
add a second section by adding at least one second boundary value within the slider track, and
expand a portion corresponding to a third settable value range narrower than the second settable value range, within the slider track, and
in response to releasing the drag input, restore the decreased interval of the settable values,
wherein the first interval is different from the second interval.

2. The electronic device of claim 1, wherein the context information further includes a type of an output device controlled by the slider track.

3. The electronic device of claim 2, wherein the processor is configured to:
identify the context information in response to reception of a user input for displaying a user interface including the slider track and the slider,
identify a ratio of a first area indicating the first section within the slider track and a ratio of a second area indicating the second section within the slider track based on the context information, and
display a slider track including the first section and the second section, based on the ratio of the first area and the ratio of the second area.

4. The electronic device of claim 1, wherein:
the slider includes one or more sliders, and
the processor is configured to display the plurality of sections such that one or more of the plurality of sections includes each of the one or more sliders.

5. The electronic device of claim 1, wherein the processor is configured to:
identify a first value corresponding to a location of the slider among the settable values,
identify stored content including a second value within a predetermined range from the first value, and
display an object indicating the identified content at a location corresponding to the second value within the slider track.

6. The electronic device of claim 5, wherein the processor is configured to configure the second value to be a value indicated by the slider based on reception of input for the object.

7. A method of operating an electronic device, the method comprising:
identifying one or more boundary values that divide settable values into a plurality of sections based on context information related to the electronic device, wherein the context information includes at least one of a usage record of the settable values or a current time;
identifying at least two intervals of the plurality of sections based on the context information;
displaying a slider track divided into the plurality of sections and a slider that can move within the slider track and indicates a value corresponding to a position of the slider within the slider track through a display of the electronic device, wherein the slider track indicates a first settable value range of the settable values;
receiving a drag input to the slider to change the value indicated by the slider;
identifying a change of a direction of a movement of the slider based on the drag input;
in response to identifying the change of the direction from a first direction to a second direction different from the first direction and parallel to the slider track while the drag input is received:
decreasing an interval of the settable values based on a first interval,
adding a first section by adding at least one boundary value within the slider track, and expanding a portion corresponding to a second settable value range narrower than the first settable value range, within the slider track;

after the slider is moved to the second direction, in response to identifying a second change of the direction from the second direction to a third direction different from the second direction and parallel to the slider track while the drag input is received:

decreasing an interval of the settable values based on a second interval, adding a second section by adding at least one second boundary value within the slider track, and expanding a portion corresponding to a third settable value range narrower than the second settable value range, within the slider track; and in response to releasing the drag input, restoring the decreased interval of the settable values, wherein the first interval is different from the second interval.

8. The method of claim 7, wherein the context information further includes a type of an output device controlled by the slider track.

9. The method of claim 8, further comprising:

identifying the context information based on reception of a user input for displaying a user interface including the slider track and the slider;

identifying a ratio of a first area indicating the first section within the slider track and a ratio of a second area indicating the second section within the slider track based on the context information; and displaying a slider track including the first section and the second section based on the ratio of the first area and the ratio of the second area.

10. The method of claim 7, wherein:

the slider includes one or more sliders, and displaying the slider that can move within the slider track comprises displaying the plurality of sections such that one or more of the plurality of sections includes each of the one or more sliders.

11. The method of claim 7, further comprising:

identifying a first value corresponding to a location of the slider among the settable values;

identifying stored content including a second value within a predetermined range from the first value; and displaying an object indicating the identified content at a location corresponding to the second value within the slider track.

12. A non-transitory computer-readable storage medium storing one or more instructions that, when executed by a processor, cause the processor to:

identify one or more boundary values that divide settable values into a plurality of sections based on context information related to an electronic device, wherein the context information includes at least one of a usage record of the settable values or a current time;

identify at least two intervals of the plurality of sections based on the context information;

display a slider track divided into the plurality of sections and a slider that can move within the slider track and indicates a value corresponding to a position of the slider within the slider track through a display of the electronic device, wherein the slider track indicates a first settable value range of the settable values;

receive a drag input to the slider to change the value indicated by the slider;

identify a change of a direction of a movement of the slider based on the drag input;

in response to identifying the change of the direction from a first direction to a second direction different from the first direction and parallel to the slider track while the drag input is received:

decrease an interval of the settable values based on a first interval, add a first section by adding at least one boundary value within the slider track, and expand a portion corresponding to a second settable value range narrower than the first settable value range, within the slider track;

after the slider is moved to the second direction, in response to identifying a second change of the direction from the second direction to a third direction different from the second direction and parallel to the slider track while the drag input is received:

decrease an interval of the settable values based on a second interval, add a second section by adding at least one second boundary value within the slider track, and expand a portion corresponding to a third settable value range narrower than the second settable value range, within the slider track; and in response to releasing the drag input, restore the decreased interval of the settable values, wherein the first interval is different from the second interval.

* * * * *